(12) United States Patent
Otashiro et al.

(10) Patent No.: US 8,601,187 B2
(45) Date of Patent: Dec. 3, 2013

(54) SEMICONDUCTOR DEVICE AND SERIAL INTERFACE CIRCUIT

(75) Inventors: Toshio Otashiro, Kameda (JP); Takuya Ikeguchi, Kawasaki (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 351 days.

(21) Appl. No.: 12/818,273

(22) Filed: Jun. 18, 2010

(65) Prior Publication Data

US 2010/0332704 A1 Dec. 30, 2010

(30) Foreign Application Priority Data

Jun. 26, 2009 (JP) .................................. 2009-151904
Mar. 24, 2010 (JP) .................................. 2010-067762

(51) Int. Cl.
*G06F 13/12* (2006.01)

(52) U.S. Cl.
USPC .................. 710/62; 710/63; 710/64; 710/65; 710/66; 710/67; 710/68; 710/69; 710/70; 710/71; 710/72; 710/73; 710/74

(58) Field of Classification Search
None
See application file for complete search history.

(56) References Cited

U.S. PATENT DOCUMENTS

| | | | | |
|---|---|---|---|---|
| 4,752,871 A | * | 6/1988 | Sparks et al. | 365/185.11 |
| 4,991,086 A | * | 2/1991 | Kojima | 712/218 |
| 5,148,539 A | * | 9/1992 | Enomoto et al. | 710/307 |
| 5,493,656 A | * | 2/1996 | Tsukamoto | 710/100 |
| 5,930,488 A | * | 7/1999 | Mitsuishi | 710/306 |
| 7,206,867 B2 | * | 4/2007 | Mosgrove | 710/9 |
| 2006/0123306 A1 | * | 6/2006 | Whetsel | 714/744 |
| 2007/0291887 A1 | | 12/2007 | Ishimoto | |
| 2008/0052430 A1 | * | 2/2008 | Kato et al. | 710/71 |
| 2008/0198148 A1 | * | 8/2008 | Miyata et al. | 345/204 |
| 2008/0221708 A1 | * | 9/2008 | Oyama et al. | 700/9 |

FOREIGN PATENT DOCUMENTS

| | | |
|---|---|---|
| JP | 3-253153 A | 11/1991 |
| JP | 4-336727 A | 11/1992 |
| JP | 2005-303414 A | 10/2005 |
| JP | 2007-324679 A | 12/2007 |
| JP | 2008-077125 A | 3/2008 |
| JP | 2008-077125 A | 4/2008 |

OTHER PUBLICATIONS

Japanese Office Action dated Jul. 4, 2013 issued in counterpart Japanese Patent Application No. 2010-067762.

* cited by examiner

*Primary Examiner* — Henry Tsai
*Assistant Examiner* — Jing-Yih Shyu
(74) *Attorney, Agent, or Firm* — Miles & Stockbridge P.C.

(57) ABSTRACT

A serial interface circuit which can adapt to various frame formats to reduce the load on a CPU. The interface circuit includes a rewritable control register used for programmably specifying a field structure to be targeted for processing out of structures of fields preceding a data field of a frame as defined by a communication protocol. The interface circuit analyzes the field structure preceding the data field according to a setting of the control register. When a destination of a received frame is determined to match an expected value, the interface circuit issues a request for the CPU to process the data field information. After a setting is made on the control register, the serial interface circuit can adapt to various formats of frames as defined by a communication protocol according to the information held there, and can also analyze a destination.

21 Claims, 27 Drawing Sheets

Fig.6

CONTROL REGISTER 0 (SXCR0)

| BIT | SYMBOL | BIT NAME | DESCRIPTION |
|---|---|---|---|
| 7~6 | - | Reserved Bit | Zero (0) is read in reading. Write zero (0) in writing. |
| ... | | | |
| 4 | BFE | Break Field enable | 0: Break Field is invalid.<br>1: Break Field is valid. |
| ... | | | |
| 2 | BDST | Start Frame detection beginning | 0: Don't care.<br>1: Begin the detection of Start Frame |
| 1 | OMS | Operation Mode set | 0:Slave mode<br>1:Master mode |
| 0 | SCIXE | SCIX enable | 0:SCIX is invalid.<br>1:SCIX is valid. |

Fig.7

CONTROL REGISTER 1 (SXCR1)

| BIT | SYMBOL | BIT NAME | DESCRIPTION |
|---|---|---|---|
| 7 | - | Reserved Bit | Zero (0) is read in reading. Write zero (0) in writing. |
| 6~4 | PIBS [2:0] | Priority Interrupt bit select [2:0] | 000: Control Field 1, Bit #0<br>001: Control Field 1, Bit #1<br>010: Control Field 1, Bit #2<br>011: Control Field 1, Bit #3<br>100: Control Field 1, Bit #4<br>101: Control Field 1, Bit #5<br>110: Control Field 1, Bit #6<br>111: Control Field 1, Bit #7 |
| 3,2 | CF1DS [1:0] | Control Field 1 data select [1:0] | 00: Primary Control Field 1 data is selected.<br>01: Secondary Control Field 1 data is selected.<br>10: Primary Control Field 1 data and Secondary Control Field 1 data are selected.<br>11: Don't set. |
| 1 | CF0RE | Control Field 0 receive enable | 0: Control Field 0 receive is invalid.<br>1: Control Field 0 receive is valid. |
| 0 | PIBE | Priority interrupt bit enable | 0: Priority interrupt bit is invalid.<br>1: Priority interrupt bit is valid. |

Fig.8

CONTROL REGISTER 2 (SXCR2)

| BIT | SYMBOL | BIT NAME | DESCRIPTION |
|---|---|---|---|
| 7,6 | RTS [1:0] | RXDX receive sampling timing select[1:0] | 00: Rising edge of 8th clock of base clocks<br>01: Rising edge of 10th clock of base clocks<br>10: Rising edge of 12th clock of base clocks<br>11: Rising edge of 14th clock of base clocks |
| ⋮ | 0 | | |

Fig.9

COMPARE ENABLE REGISTER (SXCF0CR)

| BIT | SYMBOL | BIT NAME | DESCRIPTION |
|---|---|---|---|
| 7 | CF0CE7 | Control Field 0, Bit #7 compare enable | 0: Bit #7 of Control Field 0 compare is invalid.<br>1: Bit #7 of Control Field 0 compare is valid. |
| 6 | CF0CE6 | Control Field 0, Bit #6 compare enable | 0: Bit #6 of Control Field 0 compare is invalid.<br>1: Bit #6 of Control Field 0 compare is valid. |
| 5 | CF0CE5 | Control Field 0, Bit #5 compare enable | 0: Bit #5 of Control Field 0 compare is invalid.<br>1: Bit #5 of Control Field 0 compare is valid. |
| 4 | CF0CE4 | Control Field 0, Bit #4 compare enable | 0: Bit #4 of Control Field 0 compare is invalid.<br>1: Bit #4 of Control Field 0 compare is valid. |
| 3 | CF0CE3 | Control Field 0, Bit #3 compare enable | 0: Bit #3 of Control Field 0 compare is invalid.<br>1: Bit #3 of Control Field 0 compare is valid. |
| 2 | CF0CE2 | Control Field 0, Bit #2 compare enable | 0: Bit #2 of Control Field 0 compare is invalid.<br>1: Bit #2 of Control Field 0 compare is valid. |
| 1 | CF0CE1 | Control Field 0, Bit #1 compare enable | 0: Bit #1 of Control Field 0 compare is invalid.<br>1: Bit #1 of Control Field 0 compare is valid. |
| 0 | CF0CE0 | Control Field 0, Bit #0 compare enable | 0: Bit #0 of Control Field 0 compare is invalid.<br>1: Bit #0 of Control Field 0 compare is valid. |

Fig.10

COMPARE ENABLE REGISTER (SXCF1CR)

| BIT | SYMBOL | BIT NAME | DESCRIPTION |
|---|---|---|---|
| 7 | CF1CE7 | Control Field 1, Bit #7 compare enable | 0: Bit #7 of Control Field 1 compare is invalid.<br>1: Bit #7 of Control Field 1 compare is valid. |
| 6 | CF1CE6 | Control Field 1, Bit #6 compare enable | 0: Bit #6 of Control Field 1 compare is invalid.<br>1: Bit #6 of Control Field 1 compare is valid. |
| 5 | CF1CE5 | Control Field 1, Bit #5 compare enable | 0: Bit #5 of Control Field 1 compare is invalid.<br>1: Bit #5 of Control Field 1 compare is valid. |
| 4 | CF1CE4 | Control Field 1, Bit #4 compare enable | 0: Bit #4 of Control Field 1 compare is invalid.<br>1: Bit #4 of Control Field 1 compare is valid. |
| 3 | CF1CE3 | Control Field 1, Bit #3 compare enable | 0: Bit #3 of Control Field 1 compare is invalid.<br>1: Bit #3 of Control Field 1 compare is valid. |
| 2 | CF1CE2 | Control Field 1, Bit #2 compare enable | 0: Bit #2 of Control Field 1 compare is invalid.<br>1: Bit #2 of Control Field 1 compare is valid. |
| 1 | CF1CE1 | Control Field 1, Bit #1 compare enable | 0: Bit #1 of Control Field 1 compare is invalid.<br>1: Bit #1 of Control Field 1 compare is valid. |
| 0 | CF1CE0 | Control Field 1, Bit #0 compare enable | 0: Bit #0 of Control Field 1 compare is invalid.<br>1: Bit #0 of Control Field 1 compare is valid. |

Fig.11

SCIX INTERRUPT REQUEST

| INTERRUPT REQUEST | STATUS FLAG | CAUSE OF INTERRUPT |
|---|---|---|
| IRQ_X0 (Break Field Low width detection) | BFDF | • End of the period set on the timer module, or completion of output of Break Field Low width.<br>• Occurrence of underflow of the timer module |
| IRQ_X1 (Match with Control Field 0) | CF0MF | Match of receive data of Control Field 0 with data set on the register SXCF0DR. |
| IRQ_X1 (Match with Control Field 1) | CF1MF | Match of receive data of Control Field 1 with data set on the register SXPCF1DR or SXSCF1DR. |
| IRQ_X1 (Priority interrupt bit detection) | PIBDF | Match of bit data designated as the priority interrupt bit with data set on the register SXPCF1DR. |

Fig.12

INTERRUPT-CONTROL REGISTER (SXICR)

| BIT | SYMBOL | BIT NAME | DESCRIPTION |
|---|---|---|---|
| 7 ... | | | |
| 3 | PIBDIE | Priority-interrupt-bit-detection interrupt permission | 0: Prohibit a priority interrupt bit detection interrupt.<br>1: Permit a priority interrupt bit detection interrupt. |
| 2 | CF1MIE | Match-of-Control-Field-1 interrupt permission | 0:Prohibit an interrupt on match of Control Field 1.<br>1: Permit an interrupt on match of Control Field 1. |
| 1 | CF0MIE | Match-of-Control-Field-0 interrupt permission | 0:Prohibit an interrupt on match of Control Field 0.<br>1: Permit an interrupt on match of Control Field 0. |
| 0 | BFDIE | Break Field Low width–detection interrupt permission | 0:Prohibit an interrupt on Break Field Low width detection.<br>1: Permit an interrupt on Break Field Low width detection. |

Fig.13

STATUS REGISTER (SXSTR)

| BIT | SYMBOL | BIT NAME | DESCRIPTION |
|---|---|---|---|
| 7~6 | - | Reserved bit | Zero (0) is read in reading. Write zero (0) in writing. |
| ... | | | |
| 3 | PIBDF | Priority interrupt bit detection flag | [Requirements for 1]<br>• At detection of a priority interrupt bit.<br>[Requirements for 0]<br>• At writing 1 into PIBDCL. |
| 2 | CF1MF | Control Field 1 match flag | [Requirements for 1]<br>• At match of Control Field 1 receive data and set data.<br>[Requirements for 0]<br>• At writing 1 into CF1MCL. |
| 1 | CF0MF | Control Field 0 match flag | [Requirements for 1]<br>• At match of Control Field 0 receive data and set data.<br>[Requirements for 0]<br>• At writing 1 into CF0MCL. |
| 0 | BFDF | Break Field Low width detection flag | [Requirements for 1]<br>• At detection of Break Field Low width.<br>• At completion of output of Break Field Low width.<br>• At occurrence of underflow of SCIX timer.<br>[Requirements for 0]<br>• At writing 1 into BFDCL. |

Fig.14

STATUS CLEAR REGISTER (SXSTCR)

| BIT | SYMBOL | BIT NAME | DESCRIPTION |
|---|---|---|---|
| 7~6 | - | Reserved bit | Zero (0) is read in reading. Write zero (0) in writing. |
| ... | | | |
| 3 | PIBDCL | PIBDF clear | PIBDF of SXSTR is cleared by setting this bit to 1. Zero (0) is always read in reading. |
| 2 | CF1MCL | CF1MF clear | CF1MF of SXSTR is cleared by setting this bit to 1. Zero (0) is always read in reading. |
| 1 | CF0MCL | CF0MF clear | CF0MF of SXSTR is cleared by setting this bit to 1. Zero (0) is always read in reading. |
| 0 | BFDCL | BFDF clear | BFDF of SXSTR is cleared by setting this bit to 1. Zero (0) is always read in reading. |

Fig.15

TIMER MODE REGISTER (SXTMR)

| BIT | SYMBOL | BIT NAME | DESCRIPTION |
|---|---|---|---|
| 7 | - | Reserved Bit | Zero (0) is read in reading. Write zero (0) in writing. |
| 6~4 | TCSS [2:0] | Timer Count clock source select [2:0] | 000: φ<br>001: φ/2<br>010: φ/4<br>011: φ/8<br>100: φ/16<br>101: φ/32<br>110: φ/64<br>111: φ/128 |
| ... | | | |
| 1,0 | TOMS [1:0] | Timer Operation mode select [1:0] | 00: Timer mode<br>01: Break Field Low width judge mode<br>10: Break Field Low width output mode<br>11: Don't set, please. |

Fig.16

TIMER CONTROL REGISTER (SXTCR)

| BIT | SYMBOL | BIT NAME | DESCRIPTION |
|---|---|---|---|
| 7 | | | |
| ... | | | |
| 0 | TCST | Timer Count start | 0: Stop timer counting.<br>1: Start timer counting. |

SCR

| BIT | SYMBOL | BIT NAME | DESCRIPTION |
|---|---|---|---|
| ⋮ | ⋮ | | |
| 5 | TE | Transmit Enable | 0: Prohibit the Transmit operation.<br>1: Permit the Transmit operation. |
| 4 | RE | Receive Enable | 0: Prohibit the Receive operation.<br>1: Permit the Receive operation. |
| ⋮ | ⋮ | | |

Fig.25

SSR

| BIT | SYMBOL | BIT NAME | DESCRIPTION |
|---|---|---|---|
| 7 | TDRE | Transmit Data register empty flag | [Requirements for 1]<br>• When the transmit enable bit TE of the serial control register SCR is 0.<br>• At data transfer from the transmit data register TDR to the transmit serial register TSR.<br>[Requirements for 0]<br>• When CPU writes 0 after reading the state of 1.<br>• When CPU writes transmit data into the register TDR.<br>• When the data transfer controller DTC transfers transmit data to the register TDR on a TXI interrupt request, and the setting of the controller DTC meets the flag clear condition. |
| 6 | RDRF | Receive Data register full flag | [Requirements for 1]<br>• At transfer of receive data from from the register RSR to RDR after normal termination of reception.<br>[Requirements for 0]<br>• When CPU writes 0 after reading the state of 1.<br>• When CPU reads data of RDR.<br>• When DTC transfers data from RDR on RXI interrupt request, and the setting of the controller DTC meets the flag clear condition.<br>• At the completion of data transfer from RDR to SCIX (only for the channel X). |
| ... | ... | | |

SEMICONDUCTOR DEVICE AND SERIAL INTERFACE CIRCUIT

CLAIM OF PRIORITY

The Present application claims priority from Japanese application JP 2009-151904 filed on Jun. 26, 2009 and JP 2010-067762 filed on Mar. 24, 2010, the content of which is hereby incorporated by reference into this application.

FIELD OF THE INVENTION

The present invention relates to a semiconductor device and a serial interface circuit. Particularly, it relates to a technique useful in application to a microcomputer equipped with e.g. a start/stop synchronization serial interface circuit.

BACKGROUND OF THE INVENTION

The unit for data transmission defined by a communication protocol is referred to as "frame". A frame can have a variety of field structures for the part of the frame before a data field thereof. For example, frames can be classified, in structure, into two or more types according to whether or not the frames have a break field in its head portion, and whether or not the frames have a control field fitting for the communication protocol next to the head portion. Frames of the type having the control field can be further classified into two or more types according to the format of definition of the control field, and likewise classified into two or more types according to the format of definition of an address of an address field. Conventionally, software programs have been used to cope with various communication protocols different from one another in field structure. For example, in application to a certain network system, to cope with the format of frames is made possible by making CPU execute a software program for analyzing control and address fields of frames according to the network protocol thereof. Hence, on receipt of a frame, a serial interface circuit concerned makes a request to CPU for interruption, and CPU analyzes control and address fields of the received frame. If the frame in question is directed to itself, the interface circuit continues processing the data field. If not, the circuit stops processing the data field.

Japanese published unexamined patent application No. JP-A-2008-77125 discloses an interface circuit arranged to reduce the load on CPU, which is required for a serial interface to judge a preamble and a header. The interface circuit adopts the following procedure which includes: capturing incoming transmitted data in a shift register bit by bit; storing, in FIFO register, reference data corresponding to predetermined data, such as a preamble and header, which are expected to be included in incoming transmitted data; comparing a value of FIFO register with a value of the shift register, and if they match up with each other, transferring the transmitted data in the shift register to a data register. For instance, if it is assumed that the unit of data processing by CPU is eight bits (equal to one byte), a shift register has a number of stages corresponding to a multiple of the processing unit in quantity such as an eight-bit. FIFO register is composed of: an eight-bit input register to which eight bits of known data are input in synchronization with the receive action by the shift register; and an eight-bit output register which stores data of the input register and outputs the data to a comparator in turn. Write on the input register is performed by CPU.

SUMMARY OF THE INVENTION

However, the technique as described in JP-A-2008-77125 needs to write the known data into FIFO in synchronization with the receive action each time of reception, which fails to bring about the effect of lightening the load on CPU because CPU performs the action. In addition, JP-A-2008-77125 provides a technique by which CPU makes a simple comparison between receive data and known data including a preamble and a header, which are written into FIFO each time of reception in bits, and judges whether or not to transfer the receive data to the data register. In regard to the technique, means for supporting a variety of formats of frames defined by a communication protocol is not taken into account particularly. A technique to cope with such widely varying frame formats is expected to totally depend on a type of data that CPU writes into FIFO register in synchronization with a receive action, and the step of controlling the timing of such writing, in the end.

Therefore, it is an object of the invention to provide a semiconductor device which can be made to adapt to a variety of frame formats defined by communication protocols readily, and which can reduce a load on CPU caused by a serial interface.

The above and other objects of the invention and novel features thereof will be apparent from the description hereof and the accompanying drawings.

Of preferred embodiments of the invention herein disclosed, a representative one will be briefly outlined below.

A semiconductor device according to such embodiment has a serial interface circuit including a register arranged to be rewritable, and used for programmably specifying a field structure to be targeted for processing out of structures of fields before a data field of a frame defined by a communication protocol. The serial interface circuit analyzes the field structure before the data field according to a setting of the register, and only when a destination of a received frame is judged to match an expected value, the interface circuit outputs a request for causing CPU to process information of the data field.

According to such embodiment, after the control register has been set once, the serial interface circuit can readily cope with a variety of frame formats defined by a communication protocol according to the information held by the register, and even analyze a destination. Thus, it becomes possible to avoid putting, on CPU, a load regarded as needless in the light of the destination.

The effect achieved by preferred embodiments of the invention will be briefly explained as follows.

The first is it is possible to adapt to a variety of frame formats defined by a communication protocol. The second is the load which a serial interface puts on CPU can be lightened.

BRIEF DESCRIPTION OF THE DRAWINGS

FIG. 6 is a list of stored information concerning a control register SXCR0;

FIG. 7 is a list of stored information concerning a control register SXCR1;

FIG. 8 is a list of stored information concerning a control register SXCR2;

FIG. 9 is a list of stored information of a compare-enable register SXCF0CR;

FIG. 10 is a list of stored information of a compare-enable register SXCF1CR;

FIG. 11 is a list for explaining interrupt requests;

FIG. 12 is a list of stored information of an interrupt-control register SXICR;

FIG. 13 is a list of stored information of a status register SXSTR;

FIG. 14 is a list of stored information of a status clear register SXSTCR;

FIG. 15 is a list of stored information of a timer-mode register SXTMR;

FIG. 16 is a list of stored information of a timer-control register SXTCR;

FIG. 25 is a list describing information stored in the serial status register SSR;

DETAILED DESCRIPTION OF THE PREFERRED EMBODIMENTS

1. Outline of the Preferred Embodiments

Figure 1:
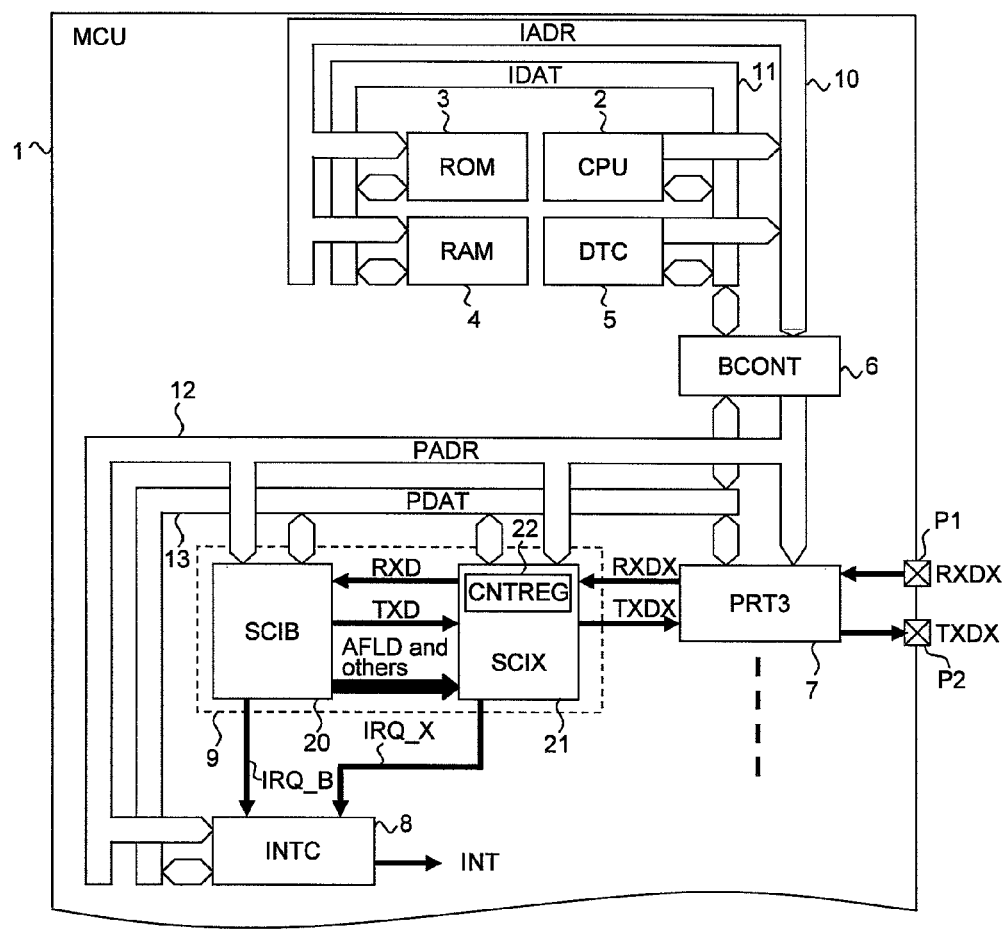
FIG. 1 is a block diagram showing a microcomputer which is an embodiment of a semiconductor device according to the invention.

A preferred embodiment of the invention herein disclosed will be outlined first. Here, the reference numerals, characters and signs for reference to the drawings, which are accompanied with paired round brackets, only exemplify what the concepts of components or elements referred to by the numerals, characters and signs contain.

[1] A semiconductor device (1) according to a preferred embodiment of the invention has a serial interface circuit (9) for serial communication, and CPU (2). The serial interface circuit includes a control register (22) arranged to be rewritable, and used for programmably specifying a field structure to be targeted for processing out of structures of fields before a data field (DFLD) of a frame defined by a communication protocol. The serial interface circuit analyzes the field structure before the data field according to a setting of the control register, and when a destination of a received frame is judged to match an expected value, the serial interface circuit outputs a request for having CPU handle information of the data field.

According to such embodiment, after the control register has been set once, the serial interface circuit can readily cope with a variety of frame formats defined by a communication protocol according to the information held by the register, and even analyze a destination. Therefore, it becomes possible to avoid putting, on CPU, a load regarded as needless in the light of the destination.

[2] <<Means for Adapting to the Number of Fields>>

In regard to the semiconductor device as described in [1], the control register of the serial interface circuit includes: a first register (SXCF0DR) for storing information used for a comparison with information of a control field of a received frame; a second register (SXPCF1DR and SXSCF1DR) for storing information used for a comparison with information of an address field of the received frame; and a setting region (SXCR1) for rewritably setting first information (CF0RE) for selecting a first or second operation. In addition, as to the semiconductor device, the first operation includes the step of issuing a request for having CPU handle information of a data field behind a subsequent field following a head field of the received frame in response to concurrence of a match resulting from a comparison between information of the head field, and information of the first register, and a match resulting from a comparison between information of the subsequent field and information of the second register, and the second operation includes the step of issuing a request for having CPU handle information of the data field following the head field in response to a match resulting from a comparison between information of the head field and information of the second register.

Thus, the semiconductor device can adapt to a frame having two fields before the data field and a frame having one field before the data field according to the set first information.

[3] <<Means for Adapting to a Frame with/without a Synchronization Field>>

In regard to the semiconductor device as described in [2], the control register further has a setting region(SXCR0) of second information (BFE) designating whether or not a synchronization pattern is located before the head field. On condition that the second information shows presence of the synchronization pattern, the serial interface circuit waits for the synchronization pattern to end, and then performs the first or second operation.

Thus, the semiconductor device can adapt to a frame having a synchronization field and a frame not having a synchronization field according to the set second information.

[4] <<Built-in Timer>>

In regard to the semiconductor device as described in [3], the serial interface circuit further includes a timer (25) for detecting the end of the synchronization pattern.

Thus, the need for using a general-purpose timer for sensing the end of a synchronization pattern is eliminated, and a load on CPU as use of a general-purpose timer would require can be avoided.

[5] <<Slave Mode and Master Mode>>

In regard to the semiconductor device as described in [4], the control register further includes: a setting region (SXCR0) of communication mode information (OMS) designating a master or slave mode, provided that in the master mode the device works as a transmit-side part of serial communication, and in the slave mode, the device works as a receive-side part of serial communication; and a setting region (SXTMR) of timer mode information (TOMS) designating a synchronization-pattern-output mode for producing and outputting the synchronization pattern by use of the timer in the master mode, or a synchronization-pattern-judge mode for detecting the end of the synchronization pattern by use of the timer in the slave mode.

The semiconductor device can be arranged so that it forms a transmit frame according to the presence or absence of a synchronization field.

[6] <<Data Register>>

The semiconductor device as described in any one of [1] to [5] further includes: a third register (SXCF0RR) for holding information of the head field to compare with information of the first register; and a fourth register (SXCF1RR) for holding information of one of the head field or subsequent field to compare with information of the second register. The serial interface circuit performs an information-holding operation of the third register, and then conducts an information-holding operation of the fourth register on condition that the first information presents a direction to select the first operation. On the other hand, the serial interface circuit performs not an information-holding operation of the third register, but an information-holding operation of the fourth register on condition that the first information presents a direction to select the second operation.

Thus, the control for adapting to a frame having two fields before the data field and a frame having one field before the data field can be achieved by a simple control means of selecting the information-holding operations in connection with the third and fourth registers according to the set first information.

[7] <<Mask Register>>

In regard to the semiconductor device as described in any one of [1] to [6], the control register further includes a setting region (SXCF0CR) of compare-enable information designating a bit position of the head field to be compared with information of the first register. Thus, a target for the comparison can be determined in bits for the head field to be compared with information of the first register.

[8] <<Mask Register>>

In regard to the semiconductor device as described in any one of [1] to [7], the control register further includes a setting region (SXCF1CR) of compare-enable information designating a bit position of the subsequent field or head field to be compared with information of the second register. Thus, as to the subsequent field or head field to be compared with information of the second register, a target for the comparison can be determined in bits.

[9] <<Priority Judge Bit>>

In regard to the semiconductor device as described in anyone of [1] to [8], the control register further has a setting region (SXCR1) of priority-judge-bit-select information (PIBS) designating a bit on the second register and enable information (PIBE) of a select bit concerned. On condition that the select-bit-enable information makes the priority-judge-bit-select information valid, the serial interface circuit limits a target for the comparison with the subsequent field in the first operation or a target for the comparison with the head field in the second operation to a range of bits on the second register designated by the priority-judge-bit-select information. Thus, it becomes possible for a microcomputer to judge as being designated, based on not only a total match, but also a partial match resulting from the comparison with an address field. For instance, in a network having a plurality of semiconductor devices which are identical with the above-described semiconductor device and mutually connected through a serial communication line, an operation such that one sender performs transmissions toward two or more semiconductor devices in parallel can be materialized readily.

[10] <<Primary/Secondary Structure of the Second Register>>

In regard to the semiconductor device as described in anyone of [1] to [9], the second register is composed of primary and secondary register. The control register further has a setting region (SXCR1) of primary-and-secondary-select information (CF1DS) designating a target for comparison with the subsequent field in the first operation or a target for comparison with the head field in the second operation in one or both of the primary and secondary registers. The arrangement as described above can achieve the flexibility in terms of the form of judging an address field.

[11] In regard to the semiconductor device as described in any one of [1] to [10], the first and second registers and control register can be rewritten by CPU. For instance, CPU can readily perform the initial settings on these registers in response to a direction for a power-on reset or system reset.

[12] In regard to the semiconductor device as described in any one of [1] to [11], the serial communication is start/stop synchronization serial communication.

[13] A serial interface circuit according to a preferred embodiment from another aspect of the invention includes a control register arranged to be rewritable, and used for programmably specifying a field structure to be targeted for processing out of structures of fields before a data field of a frame defined by a serial communication protocol. The serial interface circuit analyzes the field structure before the data field according to a setting of the control register, and when a destination of a received frame is judged to match an expected value, the interface circuit issues a request for having information of the data field processed outside.

[14] In regard to the serial interface circuit as described in [13], the control register includes: a first register (SXCF0DR) for storing information used for a comparison with information of a control field of the received frame; a second register (SXPCF1DR, SXSCF1DR) for storing information used for a comparison with information of an address field of the received frame; and a setting region (SXCR1) for rewritably setting first information (CF0RE) for selecting a first or second operation. In the serial interface circuit, the first operation includes the step of issuing outside a request for having information of a data field behind a subsequent field following a head field of the received frame processed, in response to concurrence of a match resulting from a comparison between information of the head field, and information of the first register, and a match resulting from a comparison between information of the subsequent field and information of the second register. Further, the second operation includes the step of issuing outside a request for having information of the data field following the head field processed, in response to a match resulting from a comparison between information of the head field and information of the second register.

[15] The serial interface circuit as described in [13] or [14] further includes: a third register (SXCF0RR) for holding information of the head field to compare with information of the first register; and a fourth register (SXCF1RR) for holding information of one of the head field or subsequent field to compare with information of the second register. On condition that the first information presents a direction to select the first operation, an information-holding operation of the third register is performed, and then an information-holding operation of the fourth register is conducted. Further, on condition that the first information presents a direction to select the second operation, not an information-holding operation of the third register, but an information-holding operation of the fourth register is conducted.

[16] In regard to the serial interface circuit as described in any one of [13] to [15], the control register further includes a setting region (SXCF0CR) of compare-enable information, designating a bit position of the head field to be compared with information of the first register.

[17] In regard to the serial interface circuit as described in any one of [13] to [16], the control register further includes a setting region (SXCF1CR) of compare-enable information designating a bit position of the subsequent field or head field to be compared with information of the second register.

[18] In regard to the serial interface circuit as described in any one of [13] to [17], the control register further includes priority-judge-bit-select information (PIBS) indicating a bit on the second register, and enable information(PIBE) of a select bit concerned. On condition that the select-bit-enable information makes the priority-judge-bit-select information valid, a target for the comparison with the subsequent field in the first operation or a target for the comparison with the head field in the second operation is limited to a range of bits on the second register designated by the priority-judge-bit-select information.

[19] In regard to the serial interface circuit as described in any one of [13] to [18], the second register is composed of primary and secondary register. The control register has a setting region of primary-and-secondary-select information (CF1DS) designating a target for comparison with the subsequent field in the first operation or a target for comparison with the head field in the second operation in one or both of the primary and secondary registers.

[20] In regard to the serial interface circuit as described in any one of [13] to [19], the control register further has a setting region of second information (BFE) designating whether or not a synchronization pattern is located before the head field. On condition that the second information shows presence of the synchronization pattern, the serial interface circuit waits for the synchronization pattern to end, and then performs the first or second operation.

[21] In regard to the serial interface circuit as described in [20], the serial interface circuit further includes a timer for detecting an end of the synchronization pattern.

[22] In regard to the serial interface circuit as described in [21], the control register further includes: a setting region of communication mode information (OMS) designating a master or slave mode, provided that in the master mode the interface circuit works as a transmit-side part of serial communication, and in the slave mode, the interface circuit works as a receive-side part of serial communication; and a setting region of timer mode information (TOMS) designating a synchronization-pattern-output mode for producing and outputting the synchronization pattern by use of the timer in the master mode, or a synchronization-pattern-judge mode for detecting the end of the synchronization pattern by use of the timer in the slave mode.

[23] In regard to the serial interface circuit as described in any one of [13] to [22], the first and second registers, and control register are made rewritable from outside.

[24] In regard to the serial interface circuit as described in any one of [13] to [23], the serial communication is start/stop synchronization serial communication.

2. Further Detailed Description of the Preferred Embodiments

The embodiments will be described further in detail.

<<Microcomputer>>

FIG. 1 shows a microcomputer as an example of a semiconductor device according to an embodiment of the invention. Although no special restriction is intended, the microcomputer (MCU) 1 shown in the drawing is formed on a substrate of semiconductor such as monocrystalline silicon by e.g. a known complementary MOS integrated circuit manufacturing technique.

The microcomputer 1 includes: a central processing unit (CPU) 2 operable to fetch and execute instructions in turn; a nonvolatile memory (ROM) 3 holding a program in which an instruction executed by CPU 2 is described and data; a volatile memory (RAM) 4 used as e.g. a work area of CPU 2 and a temporary storage region of data; and a data transfer controller (DTC) 5 operable to control data transfer according to the initial setting on CPU 2, which are connected to an internal address bus (IADR) 10 and internal data (IDAT) 11. The internal address and data buses are interfaced through a bus controller (BCONT) 6 with a peripheral address bus (PADR) 12 and peripheral data bus (PDAT) 13. To the peripheral address bus (PADR) 12 and peripheral data bus (PDAT) 13, e.g. an input/output port (PRT3) 7, an interrupt controller (INTC) 8 and a serial interface circuit 9 are connected as peripheral circuits. The interrupt controller 8 receives interrupt-request signals IRQ_B and IRQ_X output by e.g. a peripheral circuit typified by the serial interface circuit 9, conducts interruption-priority control or interruption-mask control in response to each interrupt request, and performs control to provide CPU 2 with an interrupt signal INT. On receipt of such interrupt signal, CPU 2 ends an instruction in the middle of execution, performs a necessary saving step, and then proceeds into execution of an interrupt step according to the cause of the interruption.

Although no special restriction is intended, the serial interface circuit 9 includes; a serial base block (SCIB) 20 operable to conduct basic steps of receive and transmit operations for serial interface according to start/stop synchronization; and a serial extend block (SCIX) 21 for coping with communication protocols different in frame structure. It is not necessarily indispensable that the serial base block 20 can be clearly differentiated from the serial extend block 21. It is obvious that they may be indistinguishable in their functions. The port 7 assigned to the serial interface is used to receive a receive signal RXDX through a terminal P1, and output a transmit signal TXDX through a terminal P2. The receive signal RXDX is input to the serial extend block 21. Then, the serial extend block 21 supplies the receive signal RXDX, as a receive signal RXD, to the serial base block 20 once. The serial base block 20 feeds data of an address field AFLD, etc., which are included in a start frame of receive data, back to the serial extend block 21, and stores data of a data field DFLD of an information frame in a data register (RDR). The serial extend block 21 analyzes the data of an address field AFLD, etc. fed back from the serial base block 20, according to a setting of the control register (CNTREG) 22, which has been set by CPU 2 in advance as a default. If the destination specified by data of the address field AFLD matches up with a expected value set on the control register 22, the serial extend block 21 outputs an interrupt request IRQ_X for making CPU 2 process the data of the data field to the interrupt controller 8. In response to this, CPU 2 processes the information frame data held by the data register (RDR) of the serial base block 20. In the transmit operation, the serial base block 20 provides the transmit signal TXD to the serial extend block 21, whereas the serial extend block 21 sends the transmit signal TXDX to the port 7 in a format designated by the control register 22. The detail of the serial interface circuit 9 will be described below.

<<Frame Structure for Start/Stop Synchronization>>

Figure 2:
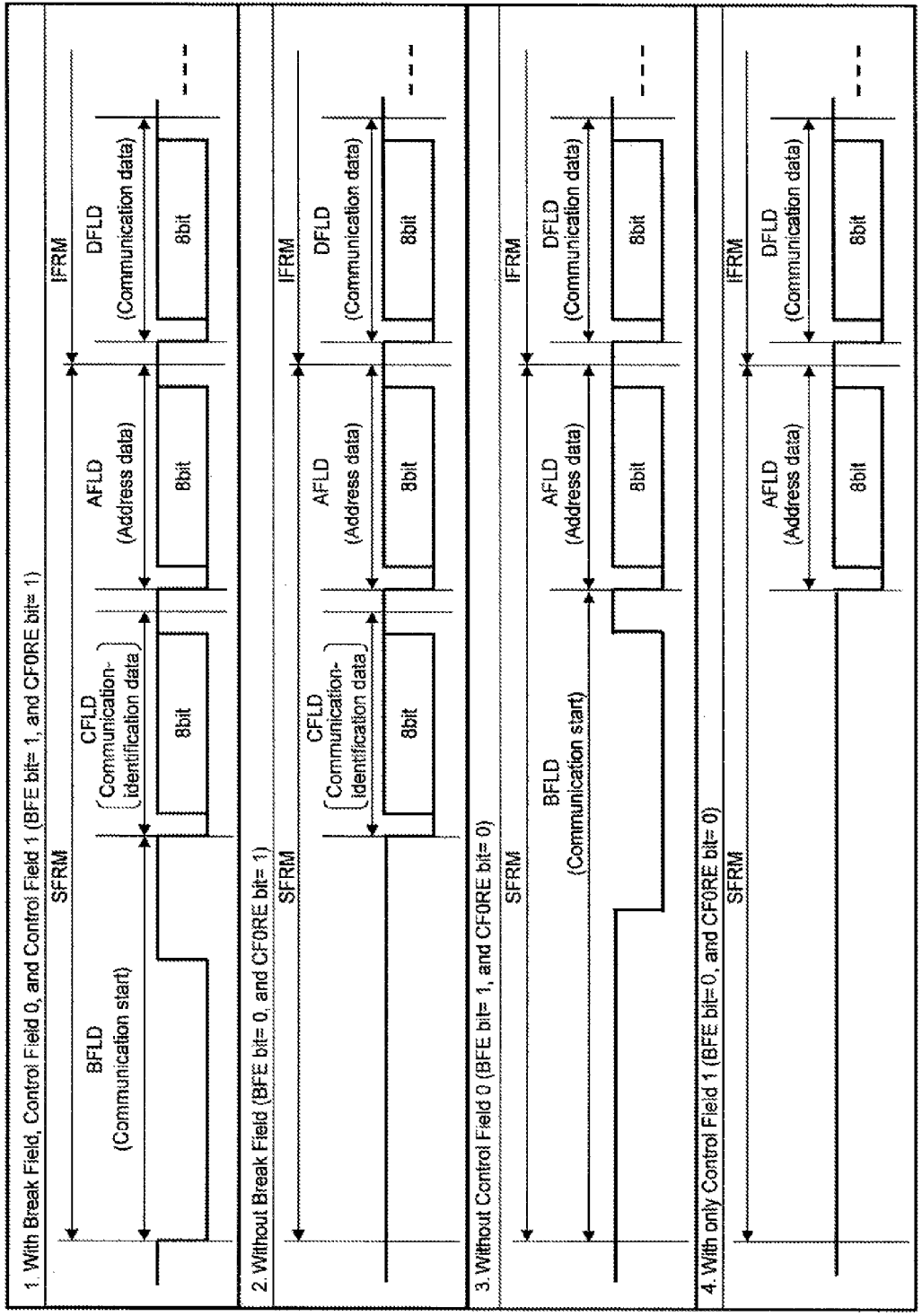
FIG. 2 is an explanatory diagram showing examples of basic frame forms, which the serial interface circuit can support selectively.

FIG. 2 shows examples of basic frame forms which the serial interface circuit 9 can handle selectively. A frame consists of a start frame SFRM and an information frame IFRM. The information frame IFRM consists of a plurality of data fields DFLD. The frame structures which the start frame SFRM may have are primarily classified into: the first form consisting of a break field BFLD, a control field CFLD also expressed as "Control Field 0", and an address field AFLD also expressed as "Control Field 1; the second form consisting of a control field CFLD and an address field AFLD; the third form consisting of a break field BFLD and an address field AFLD; and the fourth form consisting of an address field AFLD. Herein the start/stop synchronization is taken as an example of communication protocol. The data field DFLD, control field CFLD and address field AFLD each have e.g. a bit structure consisting of eight bits of information with a low-level start bit and a high-level end bit added thereto. The break field BFLD has a predetermined low-level period. Which of the four forms the serial interface circuit 9 supports depends on e.g. what CPU 2 initially sets on the control register 22 at the time of power-on-reset or system reset. The address field AFLD presents information showing e.g. a destination. The control field CFLD presents information showing the communication protocol, e.g. the kind of protocol, and information for confirming the condition of communication.

<<Serial Extend Block>>

Figure 3:
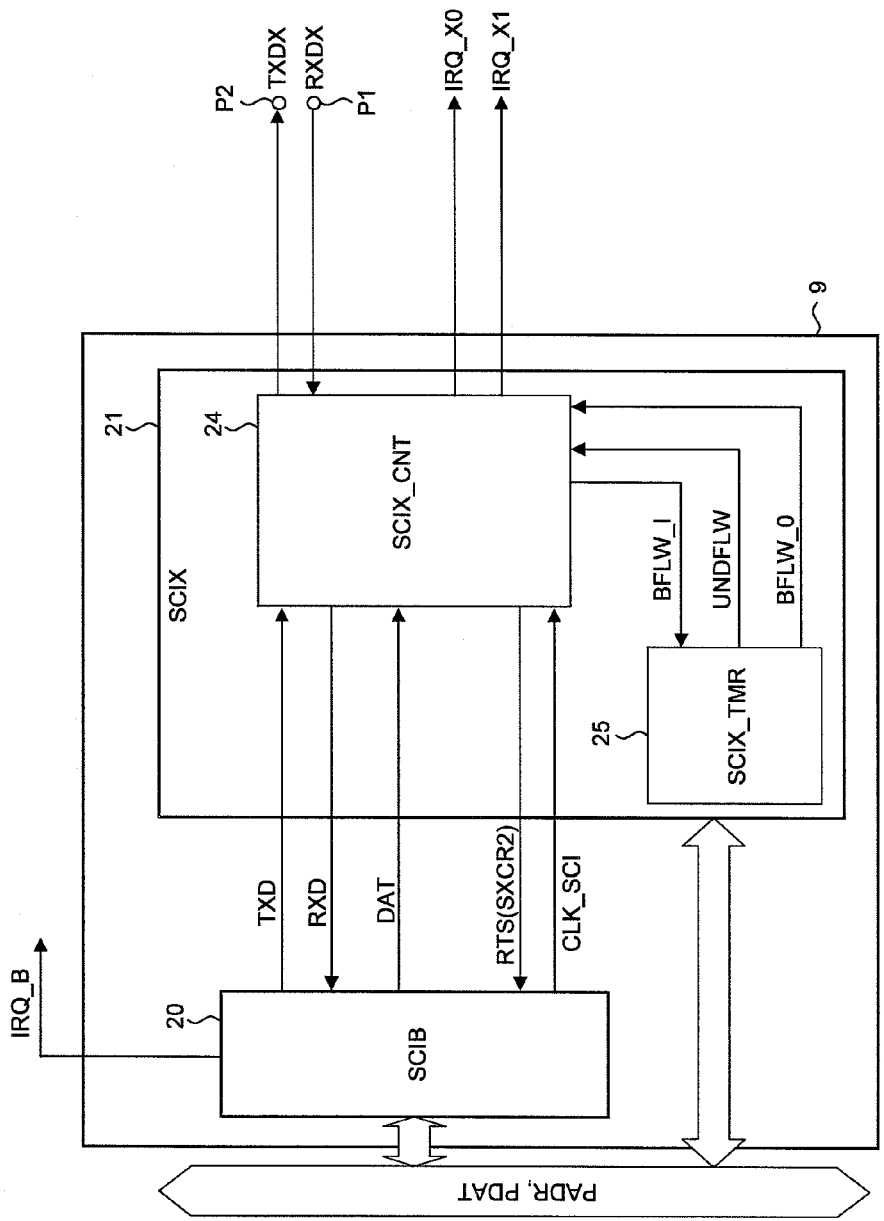
FIG. 3 is a block diagram showing an example of simplified structure of the serial interface circuit.

FIG. 3 shows a simplified structure of the serial interface circuit 9. The serial extend block 21 has an extended controller module 24 and a timer module 25. The control register 22, which is not shown in the drawing, is dispersed in the extended controller module 24 and timer module 25. According to a setting of the control register, the extended controller module 24 makes a judgment of a start frame on the receive signal RXDX, for example. The detail of this is to be described later with reference to FIG. 4. Now, the reference character CLK_SCI represents a serial-base-clock signal serving as a synchronous clock signal for serial communication of the start/stop synchronization. The control data RTS are RXDX-receive-sampling-timing-select data which define sampling timings for judgments of the data field DFLD, control field CFLD and address field AFLD, and which are prepared according to set values of the control register SXCR2 (see FIG. 8). The details of the definitions made by the control data RTS are as follows: 00 defines, as the time for sampling, the leading edge of the eighth clock of the serial-base-clock signal CLK_SCI; 01 defines the leading edge of the 10-th clock of the serial-base-clock signal CLK_SCI; 10 defines the leading edge of the 12-th clock of the serial-base-clock signal CLK_SCI; and 11 defines the leading edge of the 14-th clock of the serial-base-clock signal CLK_SCI. According to the description presented with reference to FIG. 2, RTS=01 is set. In FIG. 3, the reference character DAT represents data of a start frame SFRM including an address field AFLD and the like, which are part of the receive data RXD passed to the serial base block 20 by the serial extend block 21, and which are returned back to the serial extend block 21.

The timer module 25 performs a timer operation for judgment and creation of the low-level period of a break field according to the setting of the control register. The signal BFLW_I serves to notify the timer module 25 of the change of the break field to the low level. In the timer module 25, under a direction to execute the operation of judging the low-level period of a break field, the timer module 25 starts its timer operation in response to a falling change of the signal BFLW_I, and activates an underflow signal UNDFLW in response to the completion of the counting operation, which depends on a setting of the control register. The signal BFLW_O is the one for creating the low-level period of a break field in the transmit operation. The detail of the timer module 25 will be described later with reference to FIG. 5.

<<Extended Controller Module>>

Figure 4:
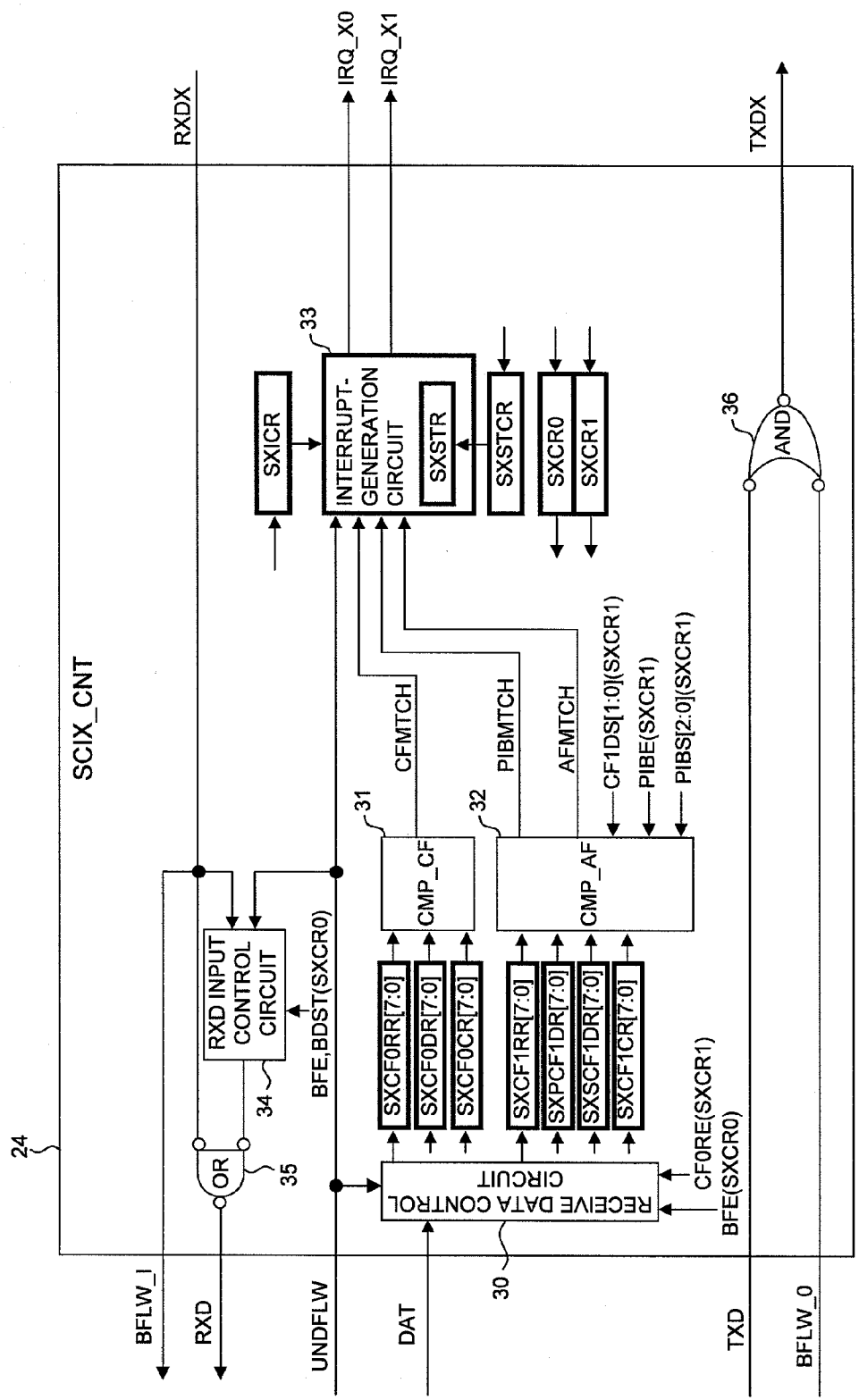
FIG. 4 is a block diagram showing details of an extended controller module of a serial extend block by way of example.

FIG. 4 shows details of the extended controller module 24 of the serial extend block 21 by way of example. The serial extend block 21 is activated by the logical value "1" of the SCIX enable bit SCIXE of the control register SXCR0 (see FIG. 6). Likewise, the logical value "0" of the operation-mode-set bit OMS of the control register SXCR0 sets the serial extend block 21 in a slave mode, where the serial extend block works as a receive-side part of serial communication, whereas the logical value "1" of the operation-mode-set bit OMS sets the serial extend block 21 in a master mode, which the serial extend block works as a transmit-side part of serial communication.

An OR gate 35 and an input control controller 34 are placed on a route of the receive signal RXDX for prohibiting the input of the break field BFLD added to the receive signal RXDX. The signal BFLW_I is supplied to the timer module 25 for the purpose of detecting the input of the break field BFLD added to the receive signal RXDX. On receipt of a signal BDST directing start of start frame detection, and a signal BFE indicating that the break field is valid, the RXD input control controller 34 outputs a voltage of high level. The RXD input control controller 34 is changed to output a voltage of low level in response to activation of the signal UNDFLW from the timer module 25. Thus, the OR gate circuit 35, which accepts an output of the RXD input control controller 34 at one input, and receives the receive signal RXDX at the other input, can prohibit the input of the break field BFLD, i.e. low-level period, contained in the receive signal RXDX. The value of the signal BDST directing start of start frame detection depends on a set value of the control register SXCR0 (see FIG. 6). The signal BFE indicates that the break field is valid/invalid according to a set value of the control register SXCR0 (see FIG. 6). Thus, with a start frame SFRM as shown in FIG. 2, the input of the break field can be prohibited, whereas information of the control field CFLD, address field AFLD and data field DFLD, subsequent to the break field can be accepted.

The receive-data controller 30 controls input of receive data fed back from the serial base block 20. The signal BFE is as already described above. The signal CF0RE is for indicating, according to a set value of the control register SXCR1 (see FIG. 7), that the reception of the control field is enabled/disabled. On condition that the signal BFE indicates the break field is valid, the receive-data controller loads, into data registers SXCF0RR and SXCF1RR, data supplied after the signal UNDFLW has been activated. The data register SXCF0RR serves to store communication-identification data of a control field, and the data register SXCF1RR serves to store address information of an address field. On condition that the reception of a control field is enabled by the signal CF0RE, the receive-data controller 30 loads first incoming data DAT into the data register SXCF0RR and the subsequent data DAT into the register SXCF1RR. However, on condition that the reception of a control field is disabled by the signal CF0RE, the receive-data controller 30 loads first incoming data DAT into the data register SXCF1RR. Thus, in regard to the frame structures shown in FIG. 2, it is possible to store communication-identification data of the control field CFLD in the data register SXCF0RR, and address information of the address field AFLD in the data register SXCF1RR, according to settings of the control register SXCR0 without fail.

The reference character SXCF0DR represents a control-expectation-data register used for comparison with the control field information stored in the data register SXCF0RR. The reference character SXCF0CR represents a compare-enable register used as a mask register (see FIG. 9). Stored in the compare-enable register is compare-enable information indicating a bit position of the control field of the data register SXCF0RR, on which a comparison is made using the information of the control-expectation-data register SXCF0DR. The values held by the registers SXCF0RR, SXCF0DR and SXCF0CR are supplied to the control-field comparator (CMP_CF) 31. The information of the control field CFLD is compared with expected data held by the register SXCF0DR, in regard to the bit position indicated by the data of the compare-enable register SXCF0CR. The result of the comparison, i.e. match/mismatch is reflected by a signal CFMTCH.

The reference characters SXPCF1DR and SXSCF1DR represent a primary-address-expected-data register and a secondary-address-expected-data register respectively, which are used for comparison with the address field information stored in the data register SXCF1RR. The reference character SXCF1CR represents a compare-enable register used as a mask register (see FIG. 10). Stored in the compare-enable register is compare-enable information indicating the bit position of the address field of the data register SXCF1RR, on which comparisons are made with information of the address-expected-data registers SXPCF1DR and SXSCF1DR. The values held by the registers SXCF1RR, SXPCF1DR, SXSCF1DR and SXCF1CR are fed to the address-field comparator (CMP_AF) 32. The address-field comparator 32 is supplied with a priority-interrupt-bit-select signal (priority-judge-bit-select information) PIBS, an expected-data-register-select signal (primary-and-secondary-select information) CF1DS, and a priority-interrupt-bit-enable signal (select bit enable information) PIBE. The values of thereof are decided according to set values of the control register SXCR1 (see FIG. 7).

The expected-data-register-select signal (primary-and-secondary-select information) CF1DS has a value indicating, as a target for the comparison with the data register SXCF1RR, the primary-address-expected-data register SXPCF1DR or/and secondary-address-expected-data register SXSCF1DR. The priority-interrupt-bit-select signal (priority-judge-bit-select information) PIBS is a form of information appropriately designating bit positions on the expected-data registers SXPCF1DR and SXSCF1DR. The priority-interrupt-bit-enable signal (select bit enable information) PIBE is a signal showing the validity/invalidity of the priority-interrupt-bit-select signal PIBS. If the priority-interrupt-bit-select signal PIBS is invalid, all of bit positions on the expected-data registers SXPCF1DR and SXSCF1DR are made targets for the comparison.

Thus, one or both of the expected-data registers SXPCF1DR and SXSCF1DR selected based on the expected-data-register-select signal (primary-and-secondary-select information) CF1DS can be made a target for comparison with the address field of the data register SXCF1RR. Further, on condition that the priority-interrupt-bit-select signal (priority-judge-bit-select information) PIBS is made valid by the priority-interrupt-bit-enable signal (select bit enable information) PIBE, the target for comparison with the address field of the data register SXCF1RR is limited to a range of bits on the expected-data registers SXPCF1DR and SXSCF1DR designated by the priority-interrupt-bit-select signal (priority-judge-bit-select information) PIBS. Thus, it becomes possible for a microcomputer to judge as being designated, based on not only a total match, but also a partial match resulting from the comparison with an address field. With e.g. a network having serial communication lines connected to a plurality of microcomputers 1, an operation such that one of the microcomputers 1 as a sender makes transmissions to other microcomputers 1 in parallel can be easily realized. Therefore, the flexibility can be gained in terms of comparison and judgment of the address field by means of the comparator 32. In other words, it becomes possible to cope with address fields of a variety of frame structures flexibly.

The match/mismatch, which is a result of the comparison by the comparator 32, is reflected by signals AFMTCH and PIBMTCH. The signal AFMTCH is activated when the address field data of the data register SXCF1RR totally matches up with the value of the selected expected-data register SXPCF1DR or SXSCF1DR, whereas the signal PIBMTCH is activated when a match with a bit on the expected-data register SXPCF1DR or SXSCF1DR, designated by the priority-interrupt-bit-select signal (priority-judge-bit-select information) PIBS is detected.

The interrupt-generation circuit 33 outputs interrupt-request signals IRQ_X0 and IRQ_X1 to the interrupt controller 8 according to the states of the signals UNDFLW, CFMTCH, PIBMTCH and AFMTCH. The meanings of the interrupt-request signals IRQ_X0 and IRQ_X1, and the statuses BFDF, CF0MF, CF1MF and PIBDF showing the causes of interrupt are exemplified in FIG. 11. The interrupt-control register SXICR gives, for each cause of interrupt, a direction to permit/prohibit an interrupt in response to the interrupt-request signal IRQ_X0 or IRQ_X1 (see FIG. 12). The statuses BFDF, CF0MF, CF1MF and PIBDF showing the causes of interrupt are set on the status register SXSTR (see FIG. 13). Although no special restriction is intended, the status register SXSTR can be cleared by setting a corresponding bit on the status clear register STSTCR (see FIG. 14).

The AND gate 36 adds the break-field-low signal BFLW_O to the transmit data TXD supplied from the serial base block 20 if required. Then, the resulting transmit data TXDX is supplied to the port 7.

Using the extended controller module 24 as described above, the following two operations can be selected according to information set on the control registers SXCR0, SXCR1, SXCR2, SXCF0CR, SXCF1CR, SCICR, SXSTR and SXSTCR. The first operation is to issue a request for making CPU 2 treat the information of the data field DFLD subsequent to the address field AFLD (a set of an interrupt request IRQ_X1 enable, and status flags CF0MF and CF1MF) in response to concurrence of a match resulting from a comparison between information of the control field CFLD of a received frame, which is held by the register SXCF0RR and information of the expected-data register SXCF0DR, and a match resulting from a comparison of information of the subsequent address field AFLD, which is held by the register SXCF1RR, and information of the expected-data registers SXPCF1DR and SXSCF1DR. The second operation is to issue a request for making CPU 2 treat the information of the data field DFLD subsequent to the address field AFLD (a set of an interrupt request IRQ_X1 enable and status flags CF0MF and CF1MF) in response to the match of information of the address field AFLD, which is held by the register SXCF1RR, and information of the expected-data registers SXPCF1DR and SXSCF1DR as a result of comparison therebetween. The control information (first information) for selecting the first or second operation is plainly CF0RE of the control register SXCR1 on the assumption that the receiving operation has been enabled by OMS and SCIXE of the control register SXCR0.

<<Timer Module>>

Figure 5:
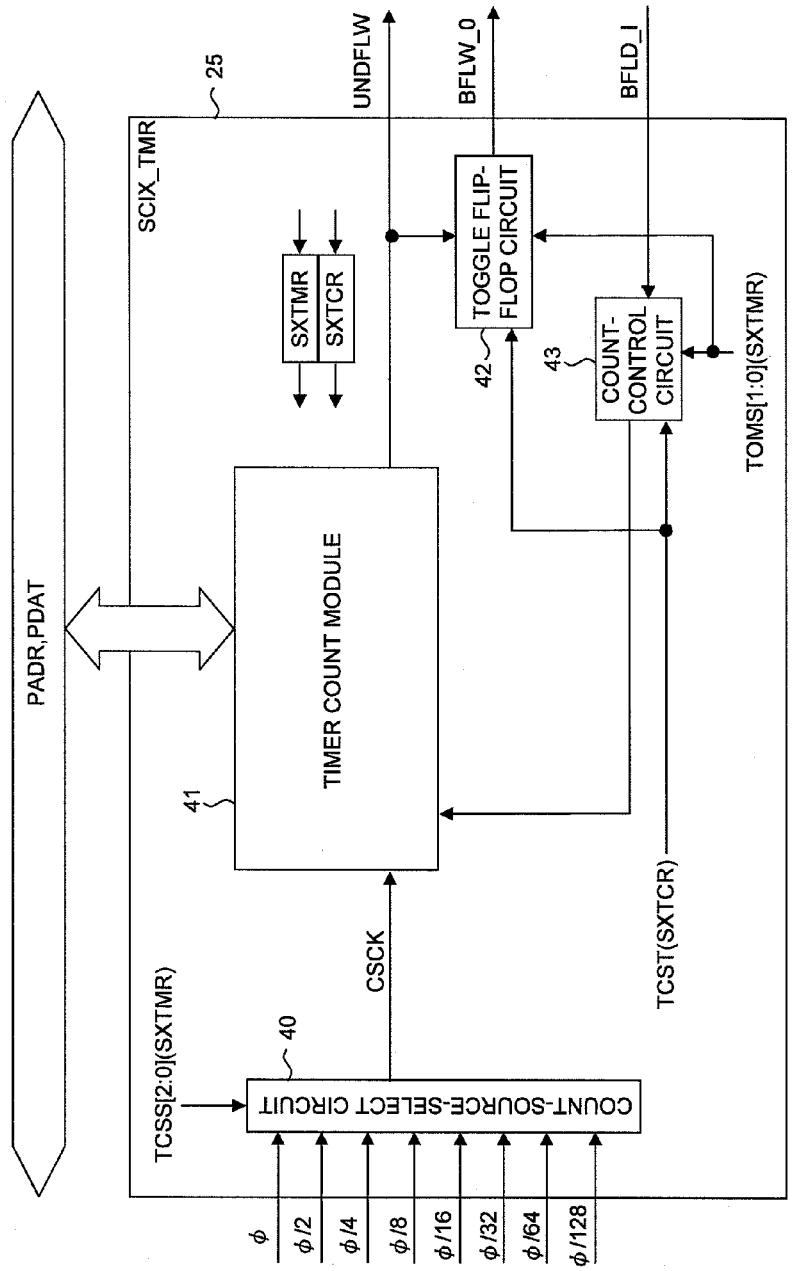
FIG. 5 is a block diagram showing the details of a timer module in the serial extend block by way of example.

FIG. 5 shows the details of the timer module 25 by way of example. The timer-count module 41 counts down in synchronization with a clock signal CSCK, on which predetermined count-start data has been preset through the peripheral address bus PADR and peripheral data bus PDAT. The count-source-select circuit 40 selects the frequency of the clock signal CSCK according to count-clock-source-select information TCSS of a timer-mode register SXTMR (see FIG. 15). Thus, up to 128 times the count time thereof can be selected with the same count-start data. On completion of the count-down from an initial value to zero (0), the timer-count module 41 changes an underflow signal UNDFLW into e.g. a pulse. The operation of the timer-count module 41 is controlled by a count controller 43. The count controller 43 controls the timer operation according to a value of the timer-operation-mode-select information TOMS of the timer-mode register SXTMR. On condition that the timer-operation-mode-select information TOMS designates a judge mode of the break field, the count controller 43 causes the timer-count module 41 to start counting down on receipt of input of a signal BFLD_I as a trigger. However, on condition that TOMS designates an output mode of the break field (at the time of transmission), the count controller 43 responds to the value 1 of a count-start bit TCST of the timer-control register SXTCR (see FIG. 16) to cause the timer-count module 41 start counting down. With the output mode of the break field designated, the count controller 43 uses a toggle flip-flop circuit 42 to forma signal BFLW_O of a low-level waveform of the break field. Specifically, the toggle flip-flop circuit 42 brings the signal BFLW_O to a low level in response to the first underflow pulse from the underflow signal UNDFLW, and it brings the signal BFLW_O to a high level in response to the next underflow pulse.

Figures 23, 24:
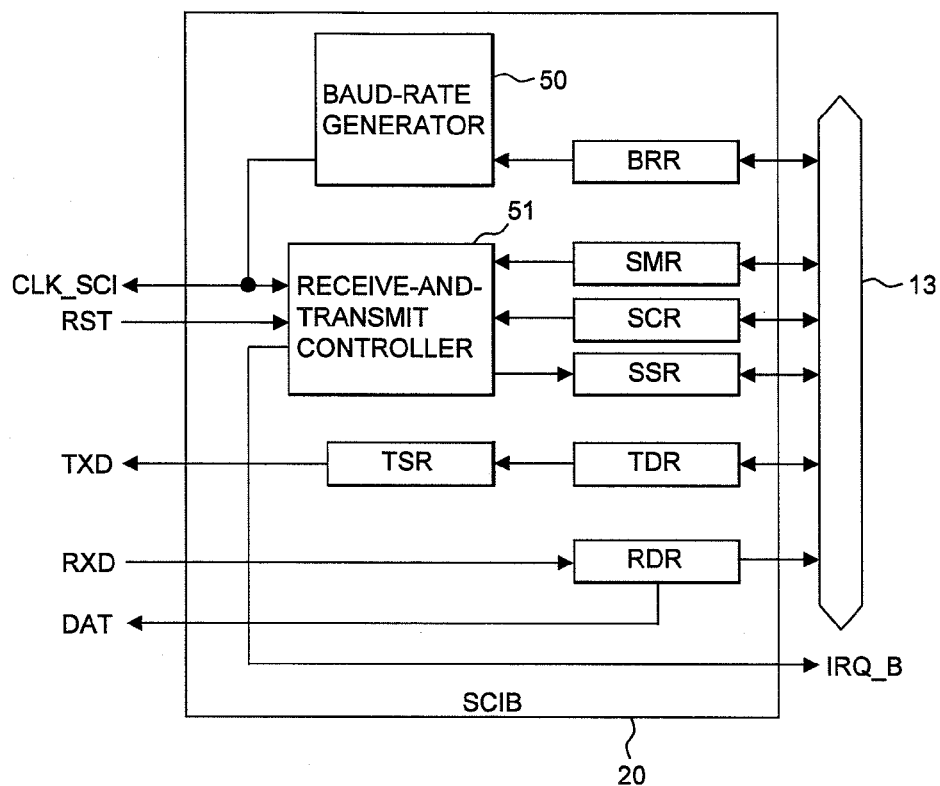
FIG. 23 is a block diagram showing an example of structure of the serial base block (SCIB)
FIG. 24 is a list of stored information of a serial control register SCR.

FIG. 23 shows an example of structure of the serial base block (SCIB) 20. The baud-rate generator 50 generates e.g. internal synchronous clock signals including the serial base clock CLK_SCI at a frequency according to a set value of the bit-rate register BRR. The receive-and-transmit controller 51 controls the receive and transmit operations of SCIB 20 based on set values of the serial control register SCR and serial mode register SMR, and control data RST. TDR represents a transmit data register, into which CPU 2 and the like load transmit data. Under the control of the receive-and-transmit controller 51, the transmit data loaded into the register TDR is parallel-transferred to a transmit serial register TSR, and subjected to a serial shift, whereby a serial transmit data TXD is output. The receive data register RDR accepts input of receive data RXD. The register RDR outputs the data thus input to the data bus 13 in response to an access by CPU 2 or the like, and feeds back the input data to the serial extend block 21 as the data DAT.

The serial mode register SMR is a register which an operation mode involved with a data length and a parity setting in connection with serial communication according to start/stop synchronization is set on. The serial control register SCR has e.g. a transmit-enable bit for designating a transmit operation, and a receive-enable bit for designating a receive operation, as shown in FIG. 24. The serial status register SSR has, as shown in FIG. 25, e.g. an empty flag (TDRE) showing whether or not the transmit data register TDR is empty in terms of transmit data, and a full flag (RDRF) showing whether or not the receive data register RDR is full in terms of receive data. The registers SMR, SCR and SSR are arranged so that CPU 2 can write and read them.

<<Receive Operation Flow>>

Figure 17:
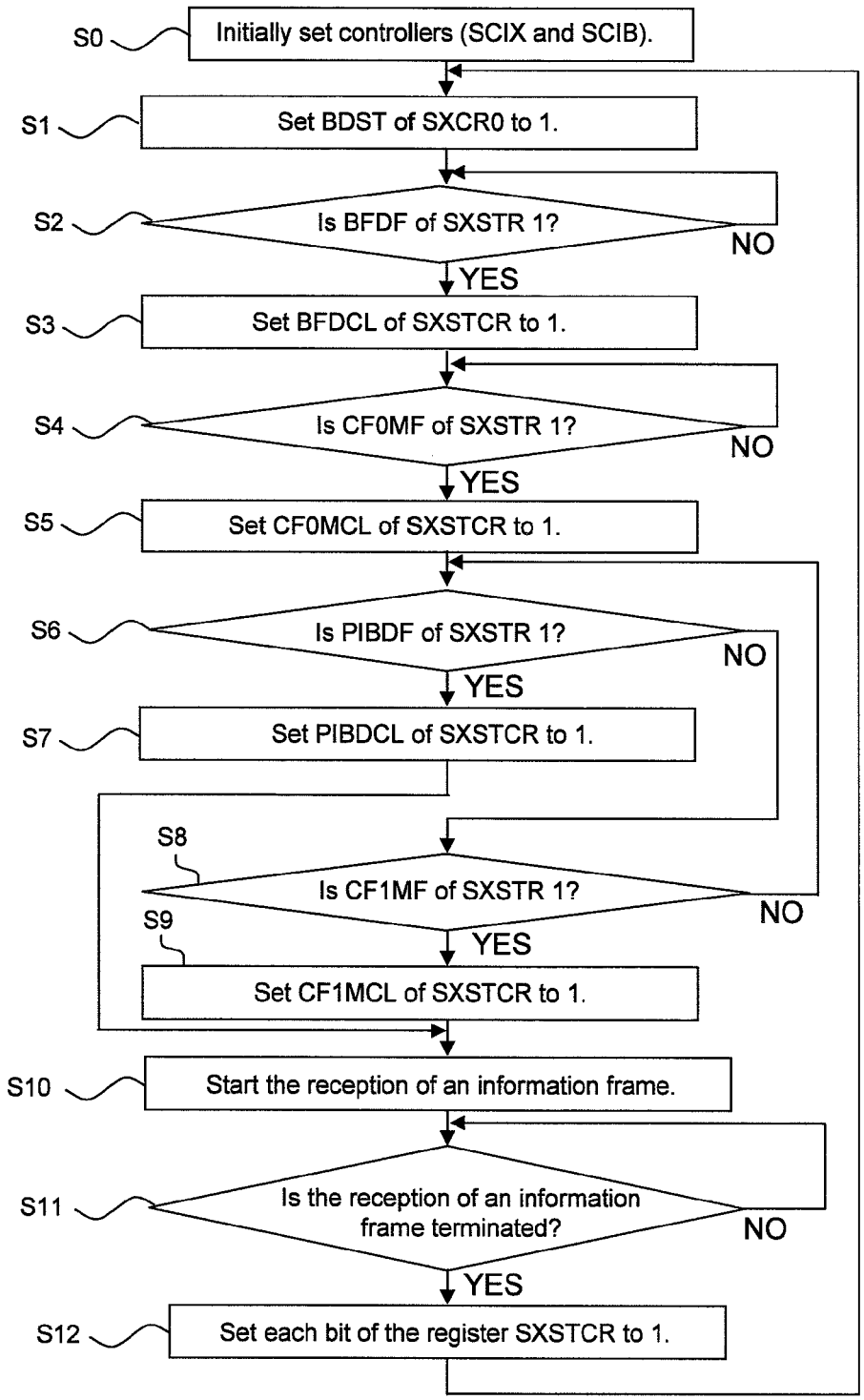
FIG. 17 is a flow chart showing an operation of processing receive data having a start frame SFRM of the first form, which consists of a break field BFLD (Break Field), a control field CFLD (Control Field 0) and an address field AFLD (Control Field 1)

FIG. 17 shows an example of the operation flow of processing receive data having a start frame SFRM of the first form, which consists of a break field BFLD (Break Field), a control field CFLD (Control Field 0), and an address field AFLD (Control Field 1).

In this operation, e.g. SCIXE=1, BFE=1, CF0RE=1 and PIBE=1 are initially set on the control register 22 of the serial extend block 21, and further, the receive-enable bit RE=1 is set on e.g. the register SCR of the serial base block 20 (S0). Although no special restriction is intended, the initial setting on these blocks is made by CPU as one step of a reset process in response to a direction of the power-on reset or system reset. The data used for the initial setting may be read from ROM 3. If ROM 3 is electrically rewritable, a set of the data for initialization can be changed readily.

By setting the start-frame-detection beginning bit BDST of the control register SXCR0 to one (1), the RXD input control controller 34 begins the detection of a start frame. On condition that the Break Field enable bit BFE of the control register shows that the break field is valid, the RXD input control controller 34 produces an output of high level and prohibits the input of the break field to the start frame SFRM until the signal UNDFLW is activated (S1). In the case of BFDIE of the register SXICR set to one (1), the interrupt-request signal IRQ_X0 is generated by setting the value BFDF of the register SXSTR to one (1) in response to the activation of the signal UNDFLW (S2). In the case of BFE showing that the break field is invalid, the output of the RXD input control controller 34 is made low level.

The flag BFDF of the register SXSTR is cleared by setting the value BFDCL of the register SXSTCR to one (1) (S3).

Then, it is judged whether the data of the control field CFLD (Control Field 0) loaded into the data register SXCF0RR matches with the expected data set on the expected-data register SXCF0DR. If the control field data matches with the expected data, the flag CF0MF of the status register SXSTR is set to the value one (1) (S4). Subsequently, the flag CF0MF of the register SXSTR is cleared by setting the value CF0MCL of the register SXSTCR to one (1) (S5).

It is judged whether or not the data of the address field AFLD (Control Field 1) loaded into the data register SXCF1RR matches with expected data set on the expected-data registers SXPCF1DR and SXSCF1DR concerning the bit position selected by the priority-interrupt-bit-select signal PIBS. If the address field data matches with the expected data, PIBDF of the register SXSTR is set to one (1) (S6). If at this point, PIBDIE of the register SXICR has been set to one (1), an interrupt for detection of a priority interrupt bit is requested by the interrupt-request signal IRQ_X1 (PIBDF). Subsequently, the flag PIBDF of the register SXSTR is cleared by setting the value PIBDCL of the register SXSTCR to one (1) (S7). If the priority interrupt bit does not detected in Step S6, the data of the data register SXCF1RR is compared with the data set on the expected-data registers SXPCF1DR and SXSCF1DR. As a result, if they match up, the flag CF1MF of the register flag SXSTR is set to one (1), and an address-field-match-detection interrupt is requested by the interrupt-request signal IRQ_X1 (S8). After that, the flag CF1MF of the register SXSTR is cleared by setting the value CF1MCL of the register SXSTCR to one (1) (S9).

After Step S7 or S9, in response to the interrupt-request signal, CPU 2 captures data of the data field DFLD of an information frame from the serial base block(SCIB) 20, and starts the reception of the information frame (S10). At the time when the reception of all of information frames is completed (S11), each flag bit of the status register SXSTR is cleared using the register-status-clear register SXSTCR (S12).

Figure 18:
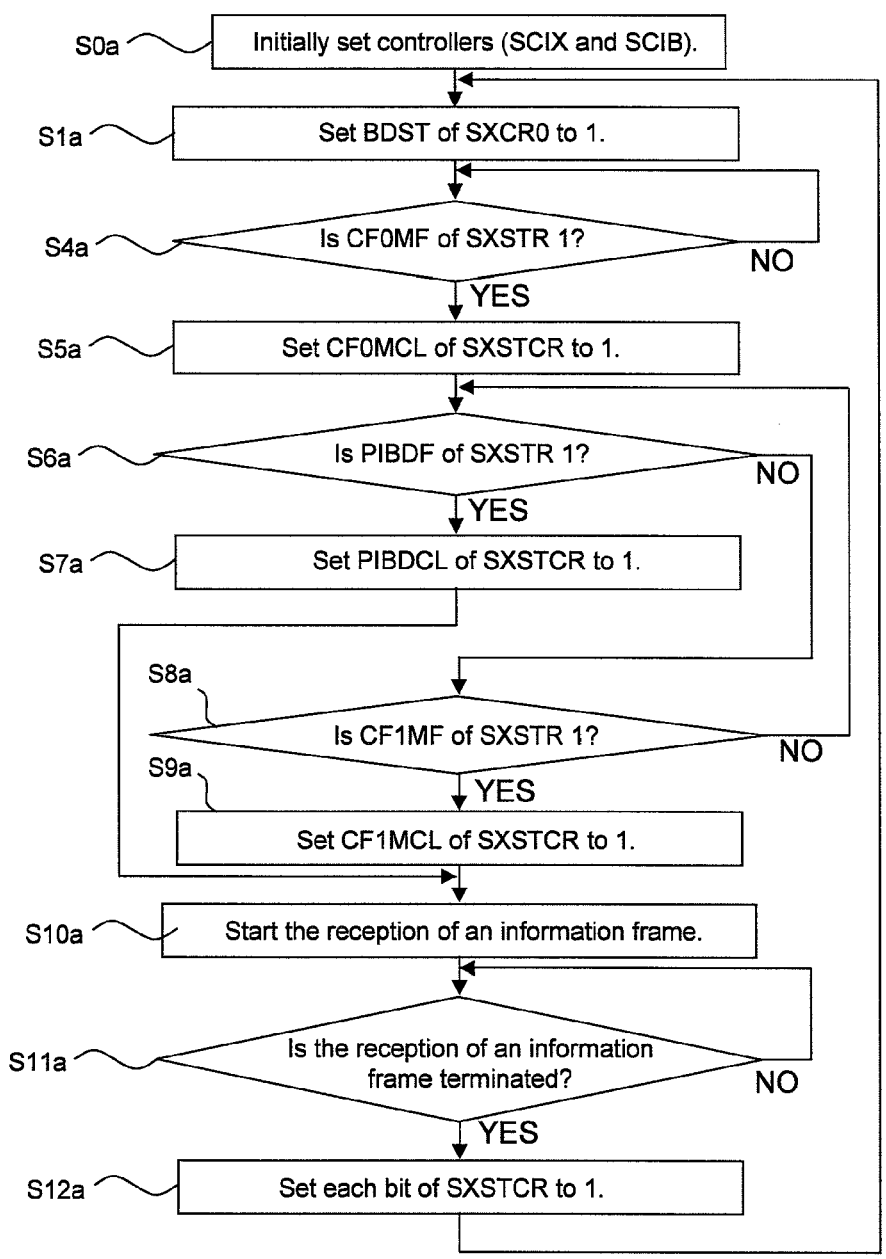
FIG. 18 is a flow chart showing an operation of processing receive data having a start frame SFRM of the second form, which consists of a control field CFLD (Control Field 0) and an address field AFLD (Control Field 1) without a break field BFLD (Break Field)

FIG. 18 shows an example of the operation flow of processing receive data having a start frame SFRM of the second form, which consists of a control field CFLD (Control Field 0) and an address field AFLD (Control Field 1) with no break field BFLD (Break Field).

In this operation, e.g. SCIXE=1, BFE=0, CF0RE=1 and PIBE=1 are initially set on the control register 22 (S0a). Because BFE=0, the processing of prohibiting the input to the break field, which is involved in Steps S2 and S3 described with reference to FIG. 17, is unnecessary. Steps S1a, S4a to S12a of FIG. 18 are the same as Steps S1, S4 to S12 of FIG. 17 in terms of processing, and therefore the detailed descriptions thereof are omitted here.

Figure 19:
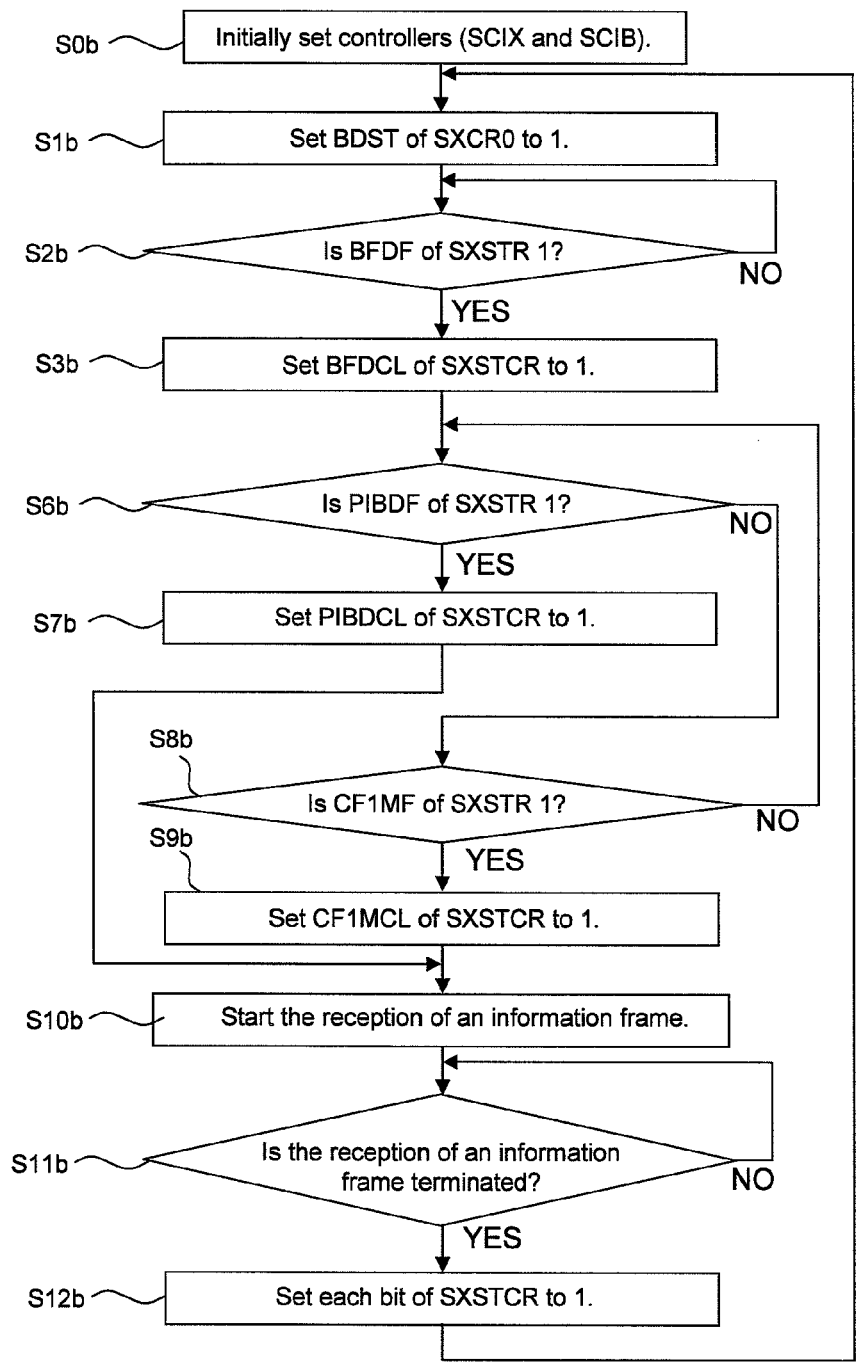
FIG. 19 is a flow chart showing an operation of processing receive data having a start frame SFRM of the third form, which consists of a break field BFLD (Break Field) and an address field AFLD (Control Field 1) without a control field CFLD (Control Field 0)

FIG. 19 shows an example of the operation flow of processing receive data having a start frame SFRM of the third form, which consists of a break field BFLD (Break Field) and an address field AFLD (Control Field 1) with no control field CFLD (Control Field 0).

In this operation, e.g. SCIXE=1, BFE=1, CF0RE=0 and PIBE=1 are initially set on the control register 22 (S0b). Because CF0RE=0, the processing of comparison and judgment on data of the control field using the expected value data, which are involved in Steps S4 and S5 described with reference to FIG. 17, is unnecessary. Steps S1b to S1b, and S6b to S12b of FIG. 19 are the same as Steps S1 to S3, and S6 to S12 of FIG. 17 in terms of processing, and therefore the detailed descriptions thereof are omitted here.

Figure 20:
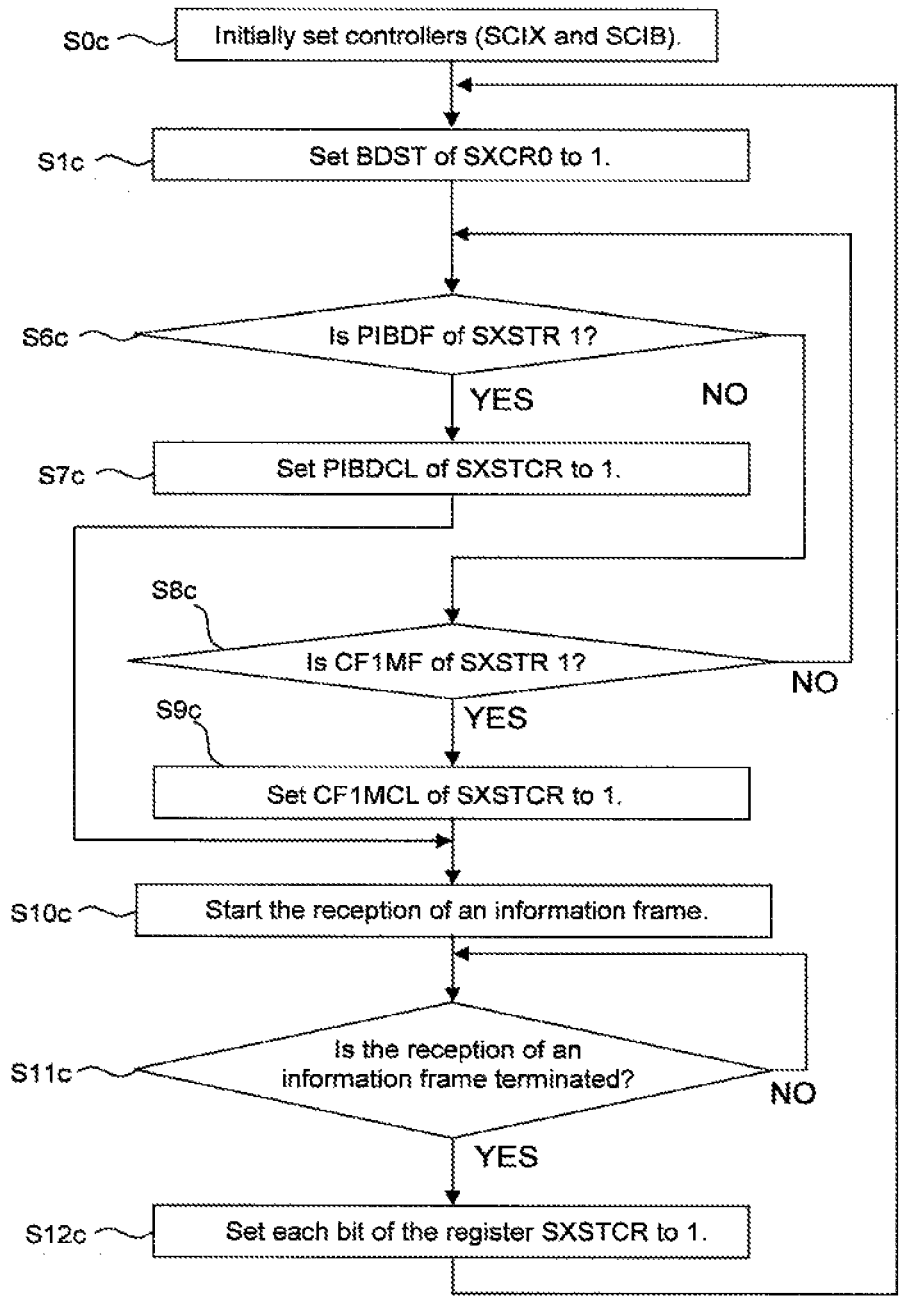
FIG. 20 is a flow chart showing an operation of processing receive data having a start frame SFRM of the fourth form, which consists of an address field AFLD (Control Field 1) without a break field BFLD (Break Field) and a control field CFLD (Control Field 0)

FIG. 20 shows an example of the operation flow of processing receive data having a start frame SFRM of the fourth form, which consists of only an address field AFLD (Control Field 1) without a break field BFLD (Break Field) and a control field CFLD (Control Field 0).

In this operation, e.g. SCIXE=1, BFE=0, CF0RE=0 and PIBE=1 are initially set on the control register 22 (S0c). Because BFE=0 and CF0RE=0, the processing of prohibiting the input to the break field, which is involved in Steps S2 and S3 described with reference to FIG. 17, is unnecessary. Further, the processing of comparison and judgment on data of the control field using the expected value data, which are involved in Steps S4 and S5 described with reference to FIG. 17, is unnecessary. Steps S1c, S6c to S12c of FIG. 20 are the same as Steps S1, S6 to S12 of FIG. 17 in terms of processing, and therefore the detailed descriptions thereof are omitted here.

<<Transmit Operation Flow>>

Figure 26:
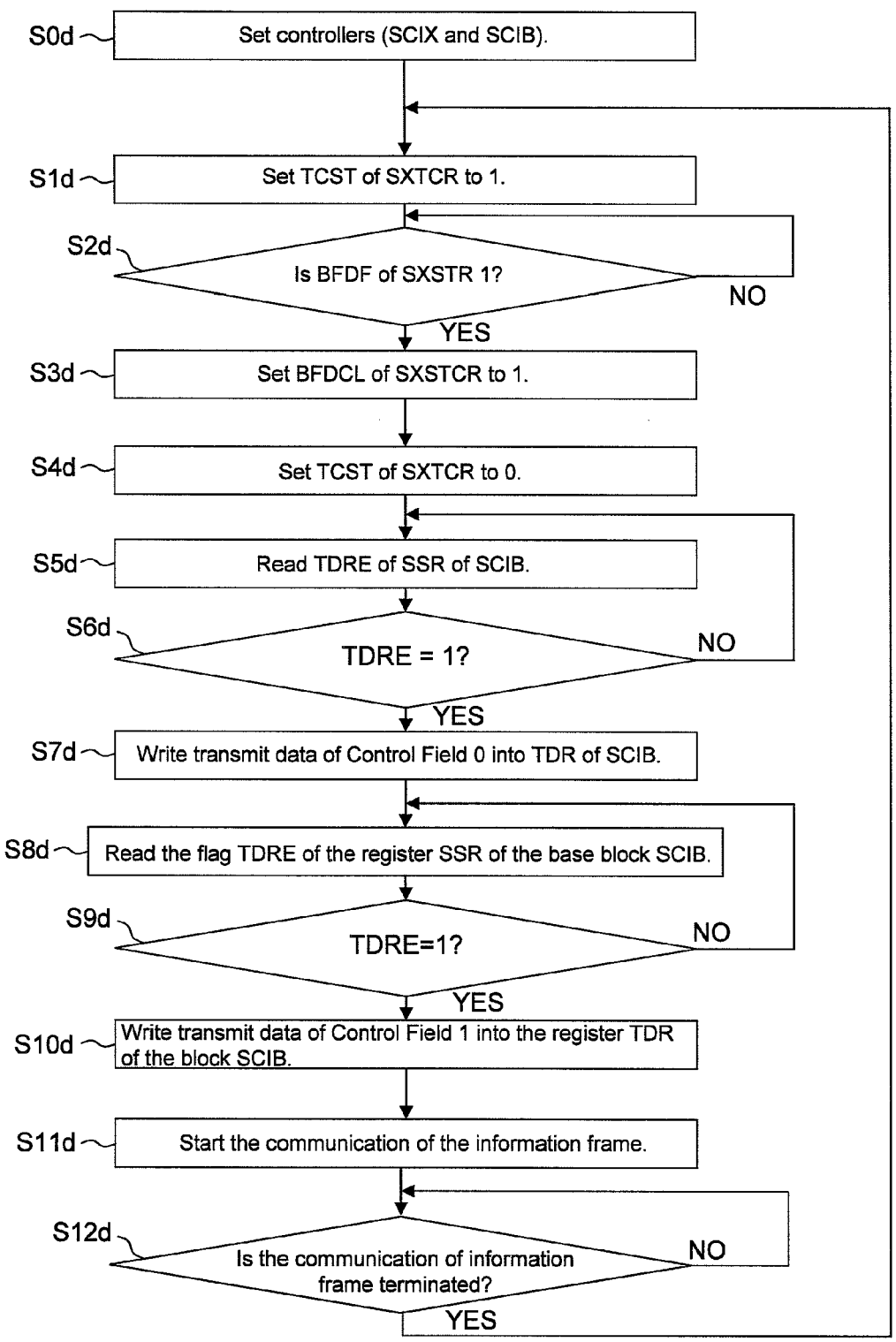
FIG. 26 is a flow chart showing an operation of processing transmit data having a start frame SFRM of the first form, which consists of a break field BFLD (Break Field), a control field CFLD (Control Field 0) and an address field AFLD (Control Field 1)

FIG. 26 shows an example of the operation flow of processing transmit data having a start frame SFRM of the first form, which consists of a break field BFLD (Break Field), a control field CFLD (Control Field 0), and an address field AFLD (Control Field 1).

In this operation, e.g. SCIXE=1 is initially set on the control register 22 of the serial extend block 21, and further, the transmit-enable bit TE=1 is set on e.g. the register SCR of the serial base block 20 (S0d). Although no special restriction is intended, the initial setting on these blocks is made by CPU as one step of a reset process in response to a direction of the power-on reset or system reset. The data used for the initial setting may be read from ROM 3. If ROM is electrically rewritable, a set of the data for initialization can be changed readily.

To produce a break field, the following steps are conducted. First, by setting TCST of the control register SXTCR to one (1), the timer module SXIC TMR 25 is caused to begin the timer operation (S1d). After the timeout thereof, a detection is performed on whether or not the flag BFDF of the register SXSTCR is one (1) (S2d). If the flag BFDF is one (1), the flag BFDCL of the register SXTCR is set to one (1), whereby the flag BFDF is cleared into zero (0) (S3d) and then the bit TCST of the register SXTCR is cleared into zero (0). In this way, a low-level period of the break field BFLD is formed. After that CPU 2 reads the flag TDRE of the register SSR of the serial base block SCIB 20 (S5d), and judges whether the value thereof is one (1), i.e. the preceding transmit data remains in the register TDR (S6d). If the transmit data register TDR is empty, CPU 2 writes, into the transmit data register TDR of the serial base block SCIB 20, data of Control Field 0, i.e. communication-identification data of the control field CFLD (S7d), and starts the transmission of communication-identification data of CFLD. During the transmission, CPU 2 reads the flag TDRE of the register SSR of the block SCIB 20 (S8d), and judges whether or not the value is one (1), i.e. all the communication-identification data of the register TDR have been transmitted and thus, the register TDR has been empty (S9d). If the register TDR is judged to be empty, CPU 2 writes data of Control Field 1 (address data of the address field AFLD), which is transmit data to be sent subsequently, into the transmit data register TDR of the block SCIB 20, thereby starting the transmission of the address data of the address field AFLD (S10d). Then, CPU 2 starts transmitting the information frame after the completion of transmission of address data of AFLD (S11d), thereafter terminates the transmission of the information frame (S12d), and waits for start of next data transmission according to Step S1d. While in the drawing, the descriptions concerning the processing steps of Steps S11d and S12d are simplified, CPU 2 repeats, a predetermined number of times, the procedure of loading and transmitting data subsequent to the information frame into the register TDR each time CPU 2 reads the flag TDRE of the register SSR and detects the data emptied.

Figure 27:
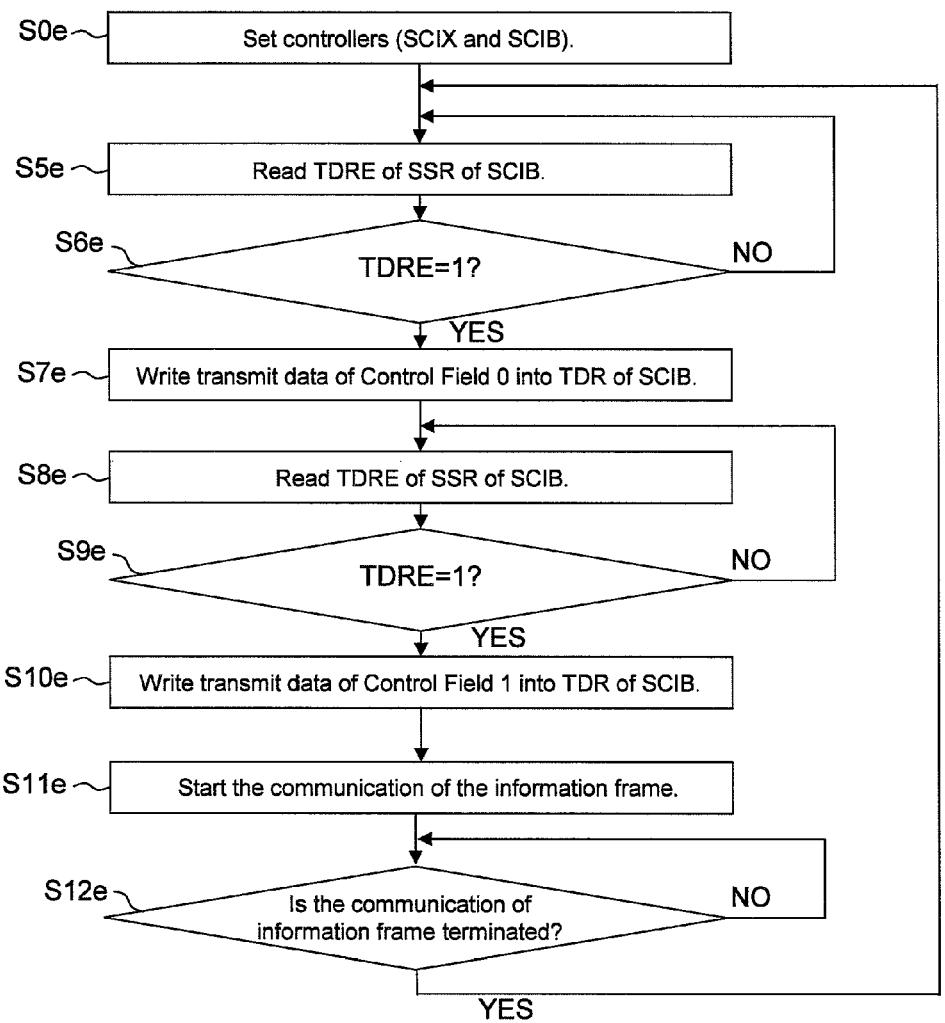
FIG. 27 is a flow chart showing an operation of processing transmit data having a start frame SFRM of the second form, which consists of a control field CFLD (Control Field 0) and an address field AFLD (Control Field 1) without a break field BFLD (Break Field)

FIG. 27 shows an example of the operation flow of processing transmit data having a start frame SFRM of the second form, which consists of a control field CFLD (Control Field 0) and an address field AFLD (Control Field 1) without a break field BFLD (Break Field).

Also, in this operation, the same setting is made on the control register 22 as made in the case of FIG. 26. However, CPU 2 skips the process of forming a break field (S1d to S4d) as described with reference to FIG. 26, and performs Steps S5e to S12e. Steps S5e to S12e are the same as Steps S5d to S12d of FIG. 26 in terms of processing, and therefore the detailed descriptions thereof are omitted here.

Figure 28:
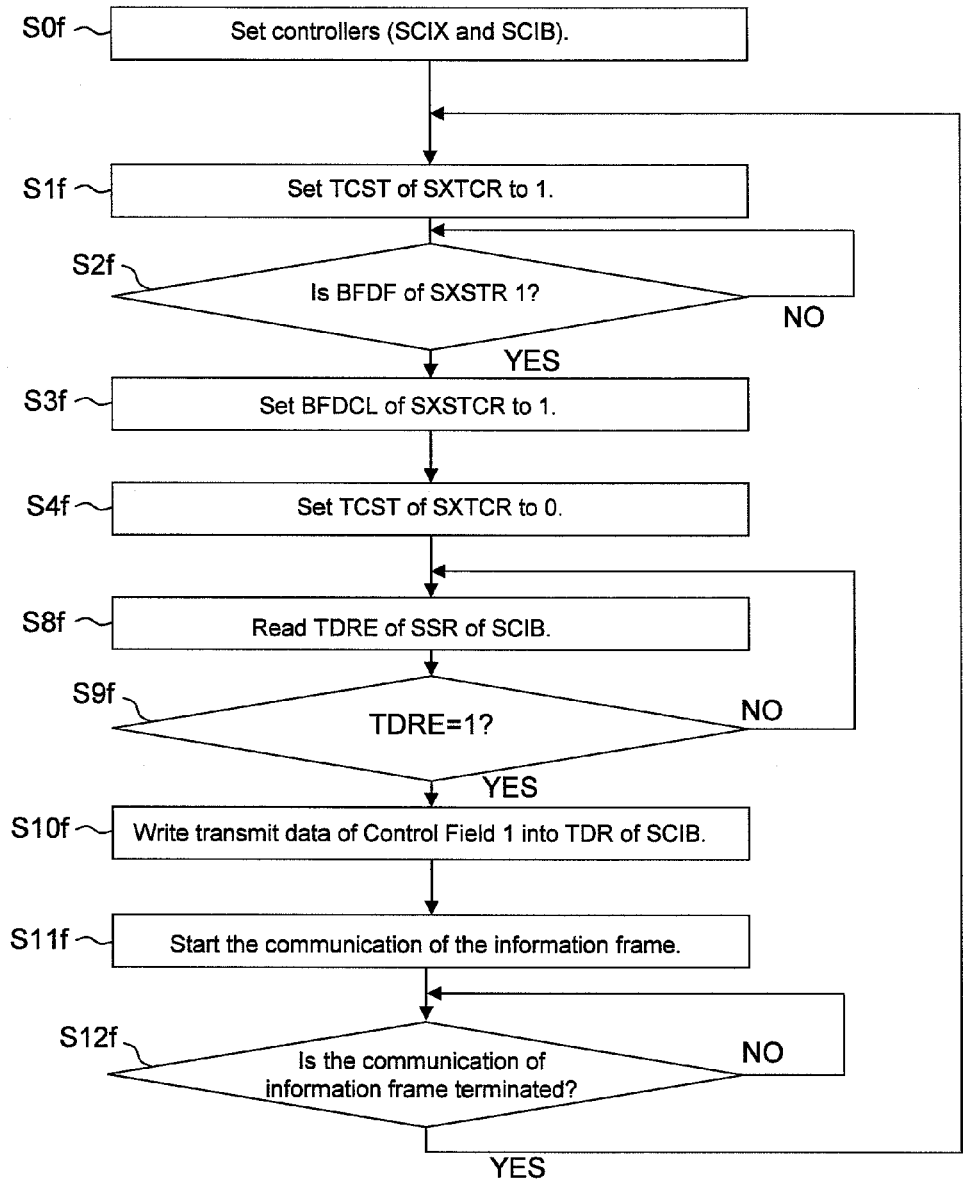
FIG. 28 is a flow chart showing an operation of processing transmit data having a start frame SFRM of the third form, which consists of a break field BFLD (Break Field) and an address field AFLD (Control Field 1) without a control field CFLD (Control Field 0)

FIG. 28 shows an example of the operation flow of processing transmit data having a start frame SFRM of the third form, which consists of a break field BFLD (Break Field) and an address field AFLD (Control Field 1) without a control field CFLD (Control Field 0).

Also, in this operation, the same setting is made on the control register 22 as made in the case of FIG. 26. However, CPU 2 skips the process of sending communication-identification data of the control field CFLD (Control Field 0) (S5d to S7d) as described with reference to FIG. 26, and performs Steps S0f to S4f and S8f to S12f. In terms of processing, Steps S04 to S4f are the same as Steps S0d to S4d of FIG. 26, and Steps 8f to S12f are the same as Steps S8d to S12d of FIG. 26. Therefore, the detailed descriptions thereof are omitted here.

Figure 29:
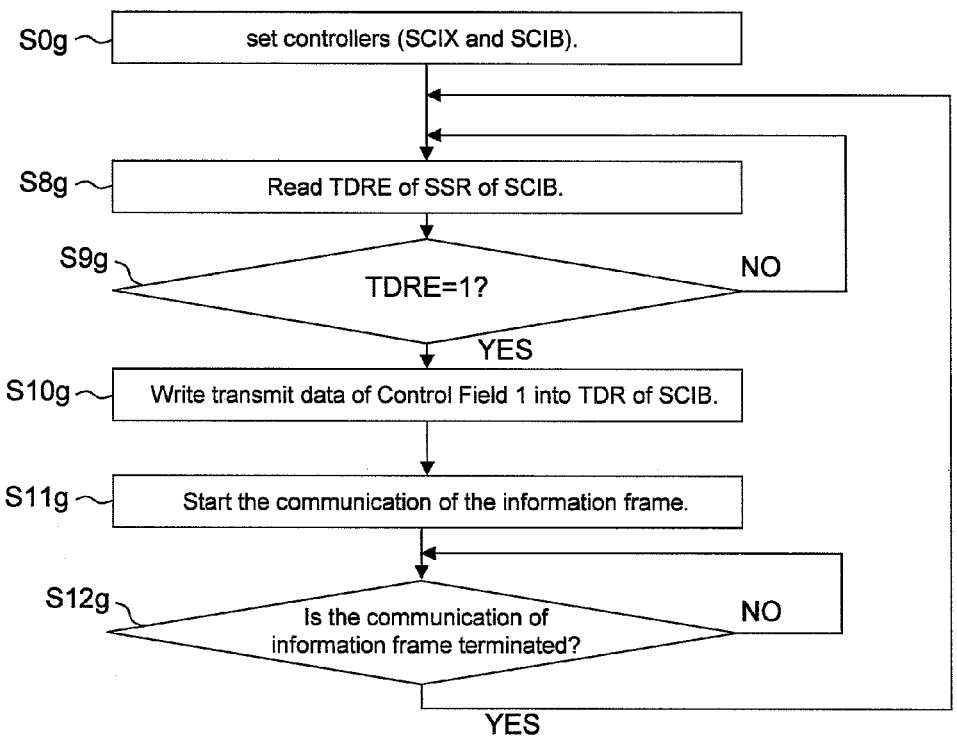
FIG. 29 is a flow chart showing an operation of processing transmit data having a start frame SFRM of the fourth form, which consists of an address field AFLD (Control Field 1) without a break field BFLD (Break Field) and control field CFLD (Control Field 0).

FIG. 29 shows an example of the operation flow of processing transmit data having a start frame SFRM of the fourth form, which consists of only an address field AFLD (Control Field 1) without a break field BFLD (Break Field) and a control field CFLD (Control Field 0).

Also, in this operation, the same setting is made on the control register 22 as made in the case of FIG. 26. However, CPU 2 skips the process of sending data of the break field BFLD (Break Field) and control field CFLD (Control Field 0) (S1d to S7d) as described with reference to FIG. 26, and performs Steps S0g, and S8g to S12g. Steps S0g and S8g to S12g are the same as Steps S0d and S8d to S12d of FIG. 26 in terms of processing, and therefore the detailed descriptions thereof are omitted here.

<<Network Structure>>

Figure 21:
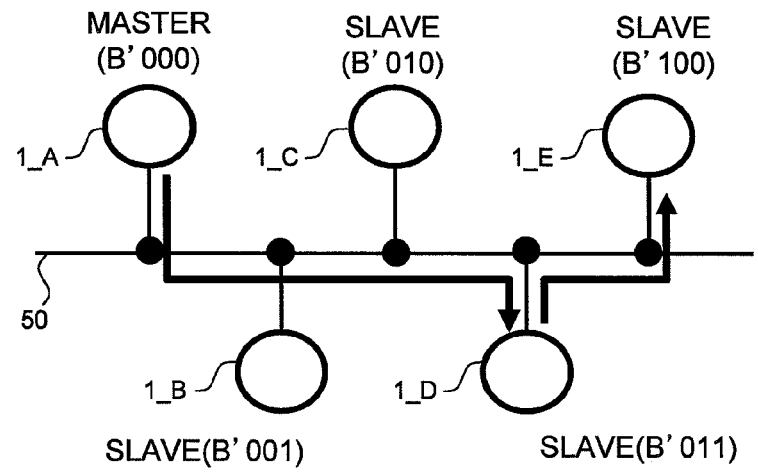
FIG. 21 is a diagram showing an example of network connection according to communication based on the one-to-one correspondence is performed, in which pieces of information of address fields AFLD are all compared with pieces of expected information, and thus a destination is judged.
Figure 22:
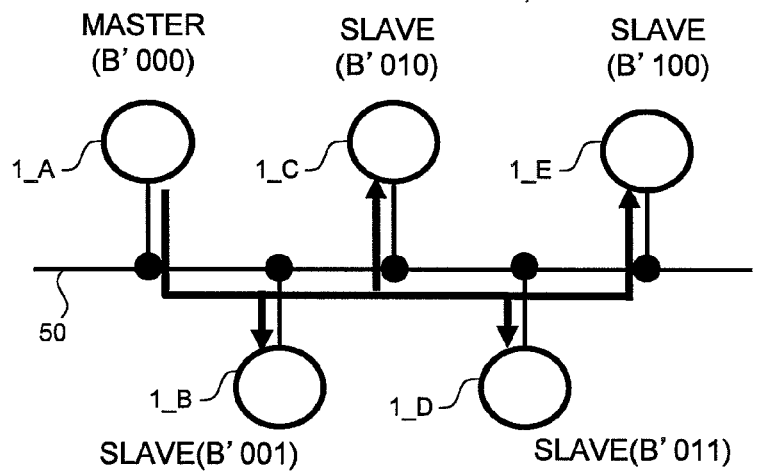
FIG. 22 is a diagram showing an example of network connection arranged so that a priority interrupt bit is designated by PIBS of the control register SXCR1, and a microcomputer of a slave mode can receive data with the designated priority interrupt bit matching an expected value even if the address of the microcomputer does not match the destination of an address field exactly.

FIGS. 21 and 22 each show an example of network connection using a plurality of microcomputers. In the drawings, the reference characters 1_A to 1_E represent microcomputers sharing a serial communication line 50, and each having the structure of the microcomputer 1 as described above. The microcomputer 1_A is operated in a master mode, and the other microcomputers 1_B to 1_E are operated in a slave mode. In the example of each drawing, different addresses between B'000 and B'100 are assigned to the microcomputers 1_A to 1_E.

In the network as shown in FIG. 21, communication based on the one-to-one correspondence is performed, in which pieces of information of address fields AFLD are all compared with pieces of expected information, and thus a destination is judged. The network as shown in FIG. 22 is arranged as follows. That is, a priority interrupt bit is designated by PIBS of the control register SXCR1, and in the case of the designated priority interrupt bit matching an expected value, a microcomputer of slave mode in question performs data reception even if the address thereof does not match the destination of the address field perfectly. If it is supposed, for example, that the position of the highest bit of an address is designated as the priority interrupt bit position, and the value thereof is zero (0), the microcomputers _A to 1_D can receive, in parallel, transmit data of the microcomputer 1_A.

The invention made by the inventor has been concretely described above based on the embodiments thereof. However, the invention is not limited to the embodiments. It is obvious that various changes and modifications may be made without departing from the scope thereof.

For instance, the invention is not limited to communication based on the start/stop synchronization such as the bit synchronization, and is also applicable to serial communication based on character synchronization. With the transmission bit of serial communication, a plurality of bits may be transmitted in parallel, or according to the differential serial communication. In addition, the frame format, field format, the number of data bits of a field, etc. may be changed appropriately.

What is claimed is:

1. A semiconductor device comprising:
   a serial interface circuit for serial communication; and
   a CPU,
   wherein the serial interface circuit receives frames having field structures containing destination information and including a data field, receives a received signal via a terminal of the semiconductor device, and transmits a transmit signal via another terminal of the semiconductor device, and
   wherein the serial interface circuit is configured to compare the field structure of a received frame with an expected field structure specified by a control register of the serial interface circuit, and when destination information of the received frame is determined to match the expected destination information specified by the control register, the serial interface circuit outputs a request to the CPU to cause the CPU to process information of the data field,
   wherein the control register of the serial interface circuit includes
      a first register for storing information used for a comparison with information of a control field of the received frame;
      a second register for storing information used for a comparison with information of an address field of the received frame; and
      a setting region for rewritably setting first information for selecting a first or second operation, the first operation including the step of issuing a request for having the CPU handle information of a data field behind a subsequent field following a head field of the received frame in response to concurrence of a match resulting from a comparison between information of the head field, and information of the first register, and a match resulting from a comparison between information of the subsequent field and information of the second register; and
      a setting region of second information showing whether or not a synchronization pattern is located before the head field,
   wherein the second operation includes issuing a request for having the CPU handle information of the data field following the head field in response to a match resulting from a comparison between information of the head field and information of the second register, and
   wherein on a condition that the second information shows presence of the synchronization pattern, the serial interface circuit waits for the synchronization pattern to end, and then performs the first or second operation.

2. The semiconductor device according to claim 1, wherein the serial interface circuit further includes a timer for detecting the end of the synchronization pattern.

3. The semiconductor device according to claim 2, wherein the control register further comprises:
   a setting region of communication mode information designating a master or a slave mode, in which in the master mode the device operates as a transmit-side part of serial communication, and in the slave mode the device operates as a receive-side part of serial communication; and a setting region of timer mode information designating a synchronization-pattern-output mode for producing and outputting the synchronization pattern using the timer in the master mode, or a synchronization-pattern-judge mode for detecting the end of the synchronization pattern using the timer in the slave mode.

4. The semiconductor device according to claim 1, further comprising:

a third register for holding information of the head field to compare with information of the first register; and a fourth register for holding information of one of the head field or subsequent field to compare with information of the second register, wherein the serial interface circuit performs an information-holding operation of the third register, and then conducts an information-holding operation of the fourth register on a condition in which the first information presents a direction to select the first operation, and wherein the serial interface circuit does not perform an information-holding operation of the third register, but rather performs an information-holding operation of the fourth register on a condition in which the first information presents a direction to select the second operation.

5. The semiconductor device according to claim 1, wherein the control register further includes a setting region of compare-enable information designating a bit position of the head field to be compared with information of the first register.

6. The semiconductor device according to claim 1, wherein the control register further includes a setting region of compare-enable information designating a bit position of the subsequent field or head field to be compared with information of the second register.

7. The semiconductor device according to claim 1, wherein the control register further has a setting region of priority-judge-bit-select information designating a bit on the second register, and enable information of a select bit concerned, and wherein, on a condition in which the select-bit-enable information makes the priority-judge-bit-select information valid, the serial interface circuit limits a target for the comparison with the subsequent field in the first operation or a target for the comparison with the head field in the second operation to a bit on the second register designated by the priority-judge-bit-select information.

8. The semiconductor device according to claim 1, wherein the second register is composed of primary and secondary registers, and wherein the control register further includes a setting region of primary-and-secondary-select information designating a target for comparison with the subsequent field in the first operation or a target for comparison with the head field in the second operation in one or both of the primary and secondary registers.

9. The semiconductor device according to claim 1, wherein the first and second registers and control register can be rewritten by the CPU.

10. The semiconductor device according to claim 1, wherein the serial communication is start/stop synchronization serial communication.

11. A serial interface circuit comprising:

a circuit configured to receive a received signal via a terminal of a semiconductor device and to transmit a transmit signal via another terminal of the semiconductor device, and which is also configured to receive frames having field structures containing destination information and including a data field, wherein the serial interface circuit is configured to compare the field structure of a received frame with an expected field structure specified by a control register of the serial interface circuit, and when destination information of the received frame is determined to match expected destination information specified by the control register, the serial interface circuit issues a request for information of the data field processed outside of the serial interface circuit, wherein the control register includes a first register for storing information used for a comparison with information of a control field of the received frame;

a second register for storing information used for a comparison with information of an address field of the received frame;

a setting region for rewritably setting first information for selecting a first or second operation, the first operation including a step of issuing to an outside of the serial interface circuit a request for information of a data field behind a subsequent field following a head field of the received frame processed, in response to concurrence of a match resulting from a comparison between information of the head field, and information of the first register, and a match resulting from a comparison between information of the subsequent field following the head field and information of the second register; and a setting region of second information indicating whether or not a synchronization pattern is located before the head field, wherein the second operation includes a step of issuing to an outside of the serial interface circuit a request for information of the data field following the head field processed, in response to a match resulting from a comparison between information of the head field and information of the second register, and wherein on a condition in which the second information indicates a presence of the synchronization pattern, the serial interface circuit waits for the synchronization pattern to end, and then performs the first or second operation.

12. The serial interface circuit according to claim 11, further comprising:

a third register for holding information of the head field to compare with information of the first register; and a fourth register for holding information of one of the head field or subsequent field to compare with information of the second register, wherein on a condition in which the first information presents a direction to select the first operation, an information-holding operation of the third register is performed, and then an information-holding operation of the fourth register is conducted, and wherein on a condition in which the first information presents a direction to select the second operation, an information-holding operation of the fourth register is conducted instead of the information-holding operation of the third register.

13. The serial interface circuit according to claim 11, wherein the control register further includes a setting region of compare-enable information designating a bit position of the head field to be compared with information of the first register.

14. The serial interface circuit according to claim 11, wherein the control register further includes a setting region of compare-enable information designating a bit position of the subsequent field or head field to be compared with information of the second register.

15. The serial interface circuit according to claim 11,
wherein the control register further has priority-judge-bit-select information designating a bit on the second register, and enable information of a select bit concerned, and
wherein on a condition in which the select-bit-enable information makes the priority-judge-bit-select information valid, a target for the comparison with the subsequent field in the first operation or a target for the comparison with the head field in the second operation are limited to a bit on the second register designated by the priority-judge-bit-select information.

16. The serial interface circuit according to claim 11,
wherein the second register is composed of primary and secondary registers, and
wherein the control register includes a setting region of primary-and-secondary-select information designating a target for comparison with the subsequent field in the first operation or a target for comparison with the head field in the second operation in one or both of the primary and secondary registers.

17. The serial interface circuit according to claim 11, wherein the serial interface circuit further includes a timer for detecting an end of the synchronization pattern.

18. The serial interface circuit according to claim 17, wherein the control register further comprises:
a setting region of communication mode information designating a master or a slave mode, in which in the master mode the interface circuit operates as a transmit-side part of serial communication, and in the slave mode the interface circuit operates as a receive-side part of serial communication; and
a setting region of timer mode information designating a synchronization-pattern-output mode for producing and outputting the synchronization pattern using the timer in the master mode, or a synchronization-pattern-judge mode for detecting the end of the synchronization pattern using the timer in the slave mode.

19. The serial interface circuit according to claim 11, wherein the first and second registers and control register are rewritable from an outside of the serial interface circuit.

20. The serial interface circuit according to claim 11, wherein the serial communication is start/stop synchronization serial communication.

21. A microcomputer comprising:
a bus;
a CPU connected to the bus;
a RAM connected to the bus; and
a serial interface circuit connected to the bus,
wherein the serial interface circuit receives a received signal via a terminal of a semiconductor device and transmits a transmit signal via another terminal of the semiconductor device,
wherein the serial interface circuit is configured to receive serial communication frames which comprise a start frame and an information frame from an outside of the microcomputer, and
wherein the serial interface circuit comprises a control register including
a first control bit having one of a first state and a second state, the first state being operable to enable an analysis of a break field in the start frame, and the second state being operable to disable the analysis of the break field in the start frame, and
a second control bit having one of a third state and a fourth state, the third state being operable to enable an analysis of a control field in the start frame, and the fourth state being operable to disable the analysis of the control field in the start frame,
a first register for storing information used for a comparison with information of a control field of the received frame;
a second register for storing information used for a comparison with information of an address field of the received frame; and
a setting region for rewritably setting first information for selecting a first or second operation, the first operation including the step of issuing a request for having the CPU handle information of a data field behind a subsequent field following a head field of the received frame in response to concurrence of a match resulting from a comparison between information of the head field, and information of the first register, and a match resulting from a comparison between information of the subsequent field and information of the second register; and
a setting region of second information showing whether or not a synchronization pattern is located before the head field,
wherein the second operation includes issuing a request for having the CPU handle information of the data field following the head field in response to a match resulting from a comparison between information of the head field and information of the second register, and
wherein on a condition that the second information shows presence of the synchronization pattern, the serial interface circuit waits for the synchronization pattern to end, and then performs the first or second operation,
wherein the serial interface circuit receives frames having field structures containing destination information and including a data field, receives a received signal via a terminal of the semiconductor device, and transmits a transmit signal via another terminal of the semiconductor device, and
wherein the serial interface circuit is configured to compare the field structure of a received frame with an expected field structure specified by a control register of the serial interface circuit, and when destination information of the received frame is determined to match the expected destination information specified by the control register, the serial interface circuit outputs a request to the CPU to cause the CPU to process information of the data field.

* * * * *